(12) United States Patent
Leighton

(10) Patent No.: US 7,688,964 B2
(45) Date of Patent: Mar. 30, 2010

(54) COMMUNICATIONS MODULE FOR CONTROLLING THE OPERATION OF A PRIVATE BRANCH EXCHANGE

(75) Inventor: Gerald Winston Leighton, Aldridge (GB)

(73) Assignee: Group 3 Technology Limited (GB)

( * ) Notice: Subject to any disclaimer, the term of this patent is extended or adjusted under 35 U.S.C. 154(b) by 1699 days.

(21) Appl. No.: 10/473,097

(22) PCT Filed: Mar. 12, 2002

(86) PCT No.: PCT/GB02/01129

§ 371 (c)(1),
(2), (4) Date: Mar. 3, 2004

(87) PCT Pub. No.: WO02/080508

PCT Pub. Date: Oct. 10, 2002

(65) Prior Publication Data

US 2004/0165713 A1    Aug. 26, 2004

(30) Foreign Application Priority Data

Mar. 28, 2001    (GB) ................................ 0107721.3

(51) Int. Cl.
*H04M 7/00* (2006.01)
(52) U.S. Cl. ..................... 379/225; 379/231; 379/234
(58) Field of Classification Search ................. 379/219, 379/225, 226, 231, 234
See application file for complete search history.

(56) References Cited

U.S. PATENT DOCUMENTS

| 4,928,304 | A |   | 5/1990 | Sakai |
| 5,309,509 | A | * | 5/1994 | Cocklin et al. .............. 379/165 |
| 5,606,604 | A |   | 2/1997 | Rosenblatt et al. |
| 5,875,242 | A | * | 2/1999 | Glaser et al. ........... 379/201.05 |
| 6,567,508 | B2 | * | 5/2003 | Katayama ................. 379/93.23 |

FOREIGN PATENT DOCUMENTS

| EP | 0829995 | 3/1998 |
| EP | 0866593 | 9/1998 |

OTHER PUBLICATIONS

International Search Report, Aug. 21, 2002.

* cited by examiner

*Primary Examiner*—Melur Ramakrishnaiah
*Assistant Examiner*—Yosef K Laekemariam
(74) *Attorney, Agent, or Firm*—Ira S. Dorman

(57) ABSTRACT

A communications module for communicating between a computer network (1, 2, 3, 4) and a private branch exchange (5), where the communications module is arranged and adapted so as:
 a. to receive commands from the computer network (1, 2, 3, 4) (computer network commands 13));
 b. if necessary to translate the computer network commands (13) into a form suitable for input into the private branch exchange (5) (private branch exchange commands (14)); and
 c. to send the private branch exchange commands (14) to the private branch exchange (5);
to effect programming of the private branch exchange (5).

21 Claims, 17 Drawing Sheets

| @ System Speed Dials | | | |
|---|---|---|---|
| System Speed Dial | | Total SD assigned : 18 | |
| Key | Tag | Number | |
| *600 | CIT | 747 | |
| *601 | Once | 205 | |
| *602 | TTAB | 200 | |
| *603 | Tariq Mahmood | 901922747600 | |
| *604 | Tracey | 205 | |
| *606 | Blank | 12312424 | |
| *607 | Blank | 205 | |
| *608 | Blank | 213123 | |

Add new or modify speed dial numbers

Select Speed Dial Code: [*600]

Enter Name Tag: [           ]

Enter Tel. Number: [           ]

Save Speed Dial

Note:
For all your external number assignments please insert your Line Access code preceeding the number you wish to store.

[Refresh]    [Print]    [Close]

Figure 15

COMMUNICATIONS MODULE FOR CONTROLLING THE OPERATION OF A PRIVATE BRANCH EXCHANGE

This invention relates to a telecommunications system comprising a computer network, a private branch exchange and a communications module for controlling the operation of the private branch exchange (PBX).

In-house telephone systems commonly use a PBX to connect a small number of trunk lines to a larger number of telecommunications devices such as telephones (digital or analogue), fax machines, CCTV etc. In conjunction with a telephone system, an organisation commonly also has a computer network system, typically having one or more server computers and a number of client computers. Typically, the computer network is connected to the external public telephone network (e.g. so as to provide Internet access) the connection being made through a routing box, either via the PBX or via separate telephone lines.

In a typical setup, although a user may have a computer (connected to the computer network) and a telephone (connected to the PBX) on his desk, the two items are separate in their operation.

A typical PBX has two types of external port that can be used to find out what is going on inside the PBX: a programming port and an event port. The programming port is how the exchange is programmed. It allows information to be put into the PBX and to be extracted from the PBX. The event port shows what events have occurred and, with some sophisticated software, what is currently happening. Some PBXs only have one external port available so the port combines both features. In a typical configuration, one telephone is nominated the master telephone. From this telephone certain features of the PBX can be programmed, but other changes must be made by a telephone engineer by way of the programming port.

Systems do exist which seek to integrate computers with various telephony functions. These systems are known as Computer Telephony Integration (CTI) systems. It is usual to describe CTI solutions as coming in one of two types: first-party call control or third-party call control. In first-party call control, the telephone is attached directly to the desk PC. In third-party call control, the computer network and the PBX are linked at the computer server level with a server application being able to set up and redirect calls more flexibly. Typically, in such third-party systems the computer network is connected to the event port of the PBX so that the computer network can interrogate the PBX.

Because a CTI system is connected to an event port, the PBX can only report current events to the server. Although it is possible for a CTI system to make telephone calls from the CTI software, the system can only react to the state of the PBX and cannot alter its state (i.e. program it).

A typical PBX has a working memory and a temporary memory. Changes can be uploaded to the temporary memory and then moved across into the working memory. Requests can be categorised into critical and non-critical. Non-critical requests can be moved directly into the working memory. Critical ones require the PBX to go through a power cycle. The power cycle requires an engineer to shut down the PBX and wait for 10 seconds before powering it back up. This causes the normal telephone service to be temporarily interrupted.

Known PBXs have no direct output devices that show the information held in the working memory. The only way an engineer can find out if a request has been successfully loaded is by a physical check. Some of these checks are easier than others. A typical simple check might be required when a user has programmed a flexible feature control button to play background music. To check that the programming has been successful, the user need only to select the button and listen. A more complex situation occurs when an engineer has programmed a group pick up entry. To be able to test this thoroughly, everyone involved in the group pickup (which could be anywhere within the company building, for example) would have to be waiting for their telephone to ring at a designated time.

Information in the PBX is stored as a fixed number of programs. Each program has a number and then contains the relevant information. Concepts within this relevant information include: ports, speed-dials, group pickup. A program within the PBX can be changed by altering the relevant information.

One of the basic concepts for a PBX is a port. A port is made up of a physical port and a logical port. A physical port represents the physical connection on a card. A logical port represents the software reference point to which an extension number in the software is attached. Extension numbers are software numbers that are attached to logical ports. These are then related to physical ports on the Peripheral Card (where actual cables are connected). They are normally the same but they do not have to be. Each extension number is unique and cannot be related to more than one logical port at any one time. These relationships are therefore held across several programs so if physical port 1 is not related to logical port 1 it can be easy for problems to occur, the cause of such problems being very difficult to identify.

A group pickup defines a set of logical ports so that if a call is made to the specific group then only one of the set of telephones need answer it. A logical port can be assigned to any number of group pickups but within any particular group pickup it can only occur once.

Speed dial numbers are used to reduce the number of digits needed to dial a particular telephone number (either an internal extension number or external telephone number). There is a system-wide speed dial table as well as a table for each user's configured speed dial set. The latter is associated with the user's extension number.

The size of the PBX determines the number of ports, number of group pick-ups and the number of speed-dials for the system table and personal tables.

Commonly, PBXs are used with digital telephones. A digital telephone typically has a set of pre-defined features with which selected buttons can be programmed. The features are generally stored in the tables on the exchange and not in the telephone (the PBX may also hold other information such as the time and date, and routing information). A table containing a number of typical such features is shown in Appendix 1. Typically, when being assigned a new telephone, or when working at an unfamiliar desk, the only way to find out what a particular telephone has been programmed to do is to test each button and see what happens.

There are solutions available that allow telephone system cards to be inserted within a computer, but computers are generally less reliable than telephone systems. In this type of arrangement, if the computer crashes (a not uncommon event) the telephone system is taken down with it. Furthermore, the computer must be on for the telephones to work.

Another issue which is problematic in known PBXs is that of programming the PBX. Currently, an engineer has to attach a laptop directly to the programming port of the PBX (or combined event port if a programming port is not present). Via a special software package, he can then program the PBX. The only way to find out that his changes have worked is when someone tries using the new features. For example if a particular telephone is assigned a new alpha tag then the change is only apparent when the user next uses the telephone. Changes in groups and group picks ups can only be found by trial and error.

Current PBXs do not have an actual output device. PBX system information, such as system speed dial information, user speed dial information, the programmed functions of particular telephones, etc. can only be downloaded by the engineer from the programming port of the PBX and decoded.

There is therefore a requirement for an improved communications module for controlling the operation of a PBX avoiding the above disadvantages. In particular, there is a requirement for a system that allows communication between a computer network and a private branch exchange (PBX), whereby the PBX may be programmed from a computer on the computer network. In particular, there is a requirement for such a system that allows a user easily to program the PBX without having to be familiar with the particular PBX commands required, or with the particular logical/physical port correspondence of each device on the network or PBX system. There is also a requirement for such a system that may be initially set up by a user, without the need for an engineer. In addition, there is a requirement for such a system which prevents a user from performing an illegal operation.

In particular, there is a requirement for a system as described above that allows a user readily to configure a telecommunications device such as a telephone or fax machine, in particular the user's own allocated telephone.

Additionally, there is a requirement for a system as described above that allows easy display or output of the information held in the working memory, such as speed dial information or function key configuration. There is also a requirement for a system that allows a user readily to check that programming of the PBX has been successful.

In addition to the above requirements, there is a requirement for a system that allows backup of the PBX system data and restoration of backed-up data.

There is, in addition, a requirement for a system that allows for remote programming of a PBX by an engineer without using a modem.

There is also a requirement for such a system that is adaptable to many types of PBX, many different telecommunications devices and also to different computer operating systems.

In addition, there is a requirement for such a system that allows the PBX and server to be located at some distance apart, for example in separate areas of a building.

There is additionally a requirement for such a system that allows different classes of user (such as user, administrator, technical, engineer etc.) different levels of access to the system. In addition, there is a requirement for a system which allows disconnection of the computer network from the PBX, for example so that a high level user may program the system without interference from commands issued by other users. There is also a requirement for such a system that disconnects the computer network from the PBX automatically when a control device is connected to the PBX, and that automatically reconnects the computer network to the PBX when the control device is disconnected. Furthermore, there is a requirement for such a system that allows the telephone system to work independently of the computer system.

EP-A-0 866 593 describes a CTI control system for use when first a telephone belonging to a first office calls up a second telephone belonging to a second office. A subscriber of the first telephone operates a first workstation connected to a computer network and edits camp-on request information when the second telephone is busy. The camp-on request information is transferred from the first workstation to a CTI server belonging to the second office connected to the computer network. The CTI server performs camp-on control between the second telephone belonging to the second office and the first telephone belonging to the first office by controlling a private branch exchange based on a schedule corresponding to the received camp-on request information.

U.S. Pat. No. 5,309,509 describes a graphical interface workstation for use with a manager controller to control and implement changes to telephone sets of customer key telephone systems served by a telephone switching system.

It is an object of the present invention to provide improved means for controlling the operation of a Private Branch Exchange (PBX). It is a further object of the present invention to provide such means fulfilling the above requirements.

According to the present invention there is provided a telecommunications system comprising a computer network, a private branch exchange (PBX) and a communications module for communicating between the computer network and the private branch exchange, the communications module being arranged and adapted so as a. to store data representing the current state of programming of the private branch exchange;
b. to receive commands from the computer network relevant to the programming of the private branch exchange;
c. to translate the commands received from the compute; network into commands suitable for programing the private branch exchange; and
d. to send the commands suitable for programming the private branch exchange to the private branch exchange so as to effect programming of the private branch exchange;

whereby the data stored by the communications module is consistent with the current state of programing of the private branch exchange.

The present invention also relates to a computer program comprising program code for performing all the steps of the system defined above when the program is run on a telecommunications system comprising a computer network and a private branch exchange.

The computer network may comprise at least one server computer and a number of client computers connected thereto, the communications module operating so that the PBX may be programed by means of commands input from a computer on the network. Connection between the computer network and the PBX may be effected between a server computer and the PBX. Communication between the communications module and the PBX may be effected using a network protocol such as TCP/IP.

Data relating to the PBX (PBX system data) may be stored on the computer network, particularly preferably on a server computer. The PBX system data may include data representing the current state of the PBX (PBX state data). The PBX system data may include data relating to the particular type of PBX in use (PBX-specific data). The PBX system data may include data relating to the particular type of computer network in use (network-specific data).

The communications module may periodically cause a copy of the current PBX state data to be stored. The copy may be stored on the computer network, such as on the server computer. Alternatively or in addition, the copy may be stored on a separate data storage means, such as a separate hard disk or a floppy disk. Storage of an updated copy of the PBX state data may be occasioned each time the state of the PBX is changed. Plural copies of PBX state data, each representing a particular previous state of the PBX, may be stored. There may be "n" stored copies of PBX state data representing the previous "n" states of the PBX. A copy of the PBX state data may be stored periodically, each copy representing a periodic backup of the state of the PBX. Alternatively, or in addition, means may be provided which allow a user to initiate the storage of a set of PBX system data and/or PBX state data.

Advantageously, the PBX state data may include data relating to features, user access levels, telephone settings, system speed dial tables, personal speed dial tables or group pickup tables.

Means may be provided for reading a selected stored set of PBX state data and for programming the PBX with the data so that a selected previous state of the PBX may be reproduced, thus providing a facility for restoring a previous state of the PBX.

Means may be provided for downloading from the computer network or the PBX a file corresponding to the current PBX state data, the downloaded file being transferred to a control device, editing of the file being effected using control device, the edited file being transferred back to the PBX, whereby the edited file is uploaded onto the PBX thereby effecting reprogramming of the PBX.

According to an embodiment, means are provided for displaying and/or printing the PBX system data, particularly the PB state data.

The PBX-specific data may include data representing those PBX commands which are suitable for the particular type of PBX in use, the data being used by the communications module in translating a computer network command into a corresponding PBX command.

The PBX-specific data may include data representing those computer network commands used by the particular type of computer network in use, the data being used by the communications module in translating a computer network command into a corresponding PBX command.

The PBX may be connected to a number of telecommunications devices, each telecommunications device having associated with it a number of user input keys, a user putting various functions of the device into operation by selecting a particular key or combinations of keys, the functions of at least some of the keys or key combinations being programmable, programming of the functions being effected by the PBX. The current state data may include data specific to each telecommunications device (device data) corresponding to the function associated with particular keys or key combinations.

The communications module may also include client computer software adapted to run on a computer on the network, the client computer software including a user interface whereby, when the software is run on a client computer, a user may program the functions of at least some of the keys of a telecommunications device via the user interface. The interface may be a graphical user interface. The graphical user interface may be a representation of the telecommunications device to be programmed.

A user may be allocated a particular computer (allocated computer) and a particular telecommunications device, (allocated device), the user being able to use his allocated computer to program his allocated device. The device data corresponding to each user's previous allocated device (previous device data) may be stored; the user being able to use his stored previous device data to program his current allocated device, so that the user can configure a newly allocated device with the settings of his previous allocated device, The user may program the allocated device from the allocated computer. The graphical user interface appearing on a users allocated computer may correspond to a representation of the user's allocated device.

Means may be provided for displaying and/or printing the current device data. Means may be provided whereby a label may be printed, the label being adapted for use with the allocated device and being printed with a legend corresponding to the current functions of the various keys associated with the allocated device.

The device data may include data relating to features, telephone settings or personal speed dial tables.

The communications module may include software which detects whether or not a user has a sufficiently high access level to perform particular tasks access to such tasks only being granted to suitably high level users. The communications module may include software which detects any attempt to perform an operation which is incompatible with the current state of the telecommunications device (illegal operation), the software acting to disallow such illegal operation.

Means may be provided so that the computer network can be connected to or disconnected from the PBX. Such means may be in the form of switching means and may also be adapted so as to allow the connection of a control device via the switching means to the PBX. The switching means may operate so as to selectively connect either the computer network or the control device to the PBX so that the PBX may be programmed from either the computer network or the control device respectively.

The switching means may normally operate in a first mode so as to connect the computer network to the PBX so that the PBX may be programmed from the computer network; the switching means being arranged so that upon connection thereto of a control device, the switching means automatically switches into a second mode wherein the computer network is disconnected from the PBX and the control device is connected to the PBX, so that the PBX may be programmed from the control device. The switching means may be further arranged so that upon disconnection therefrom of the control device, the switching means automatically switches back into the first mode, so that programming of the PBX may again be effected from the computer network.

For a better understanding of the present invention and to show more clearly how it may be carried into effect reference will now be made, by way of example, to the accompanying drawings which show schematically various embodiments of the present invention. The figures are not to scale. In the drawings:

FIG. 15 shows a system speed dial screen;

Figure 1:
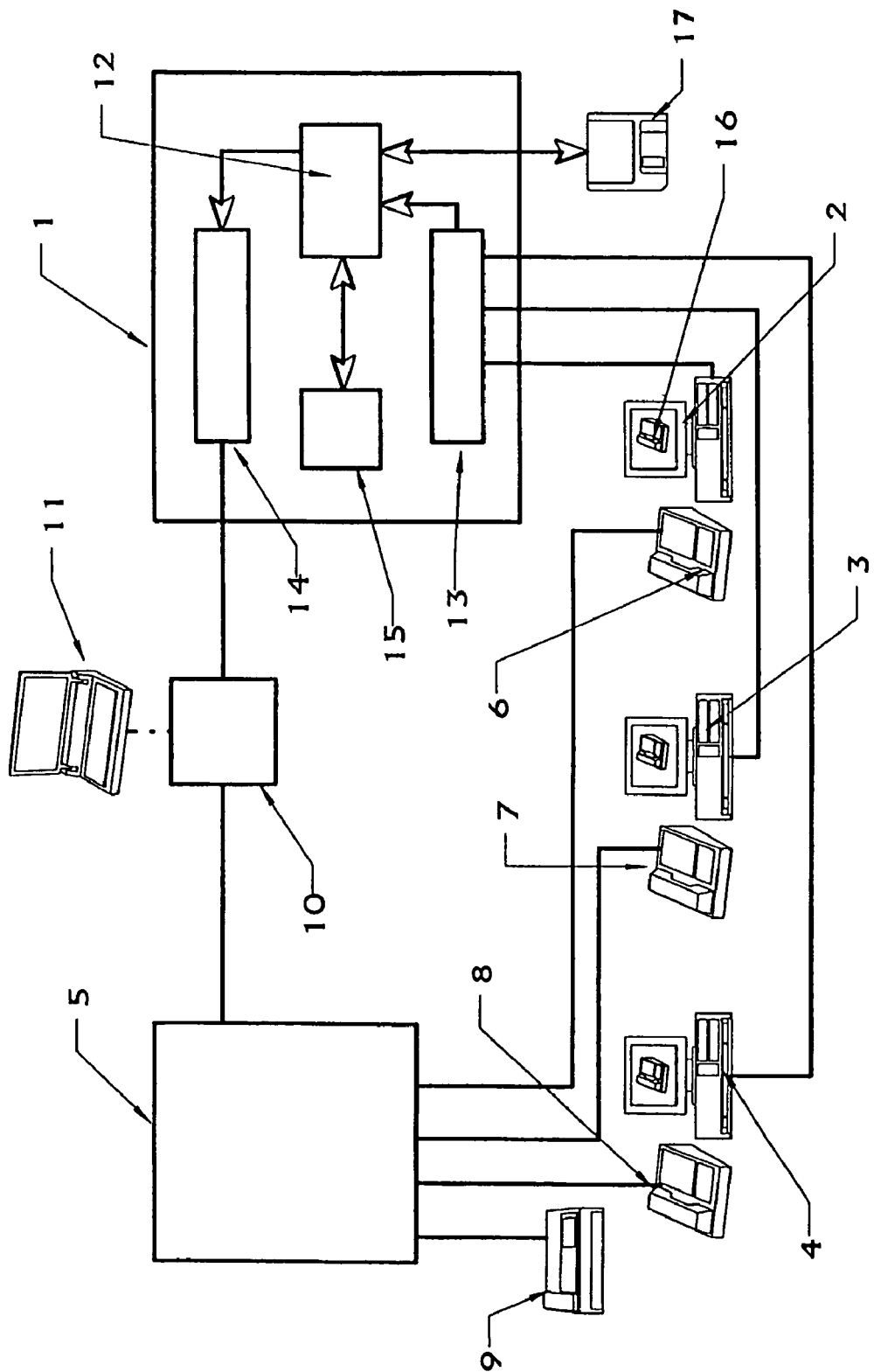
FIG. 1 is a diagrammatic representation of a system embodying the present invention.

In FIG. 1 a computer network comprises a computer server 1 connected to a number of client computers 2, 3, 4. A PBX 5 is connected to a number of telecommunications devices e.g. telephones 6, 7, 8, fax machines 9 or other telecommunication devices (not shown). Typically a user will be allocated a particular computer 2, say, and telephone 6, say, which may both be located on the user's desk (not shown). The computer server is connected to the programming port of the PBX 5 via an automatic disconnect switch 10, the operation of which is described in outline below and a particular embodiment of which is disclosed in our copending UK application no. 0107720.5.

The automatic disconnect switch 10 is a non-powered automatic disconnect switch. It consists of a line that connects to the PBX programming port and two connectors. One connector connects to the computer server 1, and thus to the client computers 2, 3, 4, permanently. The other connector is empty unless an engineer wants to program the PBX 5 directly (manually). If so, he connects his laptop computer 11 into this empty connector, which causes the line from the computer server 1 to be disconnected from the PBX. When the engineer is finished, he unplugs his laptop computer 11 from the automatic disconnect switch 10 and the computer server 1 is automatically reconnected to the PBX 5. The communications module software monitors the state of this line and can detect when the line is broken and thus ensure that nothing is sent to the PBX 5 until it is reconnected. The PBX will continue to operate, although it will not be programmable from the computer network during the time the computer network is disconnected from the PBX. Any users trying to change any information will be notified.

Control devices other than a laptop computer 11 are also connectable to the automatic disconnect switch 10 if desired.

Also shown schematically in FIG. 1, a communications module includes software 12 running on the computer server 1. The communications module also includes handset programming software (see FIG. 3) running on each of the client computers 2, 3, 4. The server component 12 (FIG. 1) of the communications module receives computer network commands 13 which have been issued from a client computer (it would also be possible to configure the server computer so that commands could be input directly at the server). Various sets of data relating to the system are also stored in a data store 15 located on the server 1. This PBX system data typically comprises data representing the current state of the PBX (current state data), data relating to the particular type of PBX in use (PBX-specific data), and data relating to the particular type of computer network in use (network-specific data). Furthermore, the PBX system data may also comprise one or more copies of previous PBX state data. The server communications module component 12 translates the computer network commands 13 into commands suitable for programming the PBX (PBX commands, 14), using the PBX system data. The PBX commands are then transferred, preferably using a network protocol such as TCP/IP, to the programming port of the PBX 5 whereby to program the PBX.

As discussed, handset programming software is loaded onto each client computer 2, 3, 4 and includes a user interface 16, by means of which the user can program the PBX. The user interface is preferably a graphical user interface (GUI, 16) and most conveniently includes a representation of the user's allocated telecommunications device 6. The user can therefore use known GUI techniques such as drag-and-drop, highlighting, double-clicking etc. to effect programming of the allocated device.

The communications module may also cause a download of the PBX system data to an external device 17 which may be, for example, a floppy disk or other storage means as shown, or may be a modem connection to another computer. This download may be used as a complete system backup, or may be used in order to remotely reprogram the system. In this case, the downloaded information is sent to an engineer, who can upload the information onto a computer and, for example, make system changes that are too complex to be carried out by a user. The altered PBX system data is then downloaded again onto a data carrier or via a modem and uploaded onto the server.

A user typically has at least one telephone 6, 7, 8 and a computer, such as a PC 2, 3, 4 sitting on his desk. The PC is connected to the organisation's computer network and the user typically has access to a printer (not shown) via the network. The telephone(s) are connected to the PBX 5.

A specific embodiment of the invention will now be described. In the following description, the complete communications module will be referred to as the Telecom Data Network Portal (TDNP), the server component being referred to as the network portal (NP) which resides on the server 1 and the Handset Programmer (HP) a copy of which resides on any number of client computers 2, 3, 4 within the computer network.

A main purpose of the NP is to synchronise the state of the PBX to the state defined on the computer network.

A main purpose of the HP application is to allow the user to program his telephone 6 on his desk from his computer 2.

According to this particular embodiment, the HP also provides various user levels to provide features suitable to various different types of user.

1. User. The "user" level is aimed at the non-technical person who just uses the telephone. It allows the user to personally set up/program his phone, incorporating the ability to print labels corresponding to the programmed functions of the phone control keys on a 'local' printer on the computer network. The interface is comprehensive (i.e. it lists all of the possible features the telephone can be programmed with) and easy to use. It provides on-screen guidance help.

2. System Administrator. A typical system administrator would be the telephone receptionist. The system administrator can do the above for his or her own telephone or any user's telephone and extra features such as changing the system speed dial, group pick-up, date and time.

3. Technical. A typical technical person is one who understands the telephone and computer network, e.g. office service manager. This level has all the previous features and extra features include changing the date and time for the PBX, change the backup scheduling, synchronise the TDNP with the PBX now and to use the remote programming facility.

4. Engineer. This is typically not a company employee but a specialist telecommunications engineer trained on all aspects of the PBX. There are two extra features for this level: to store a complete backup (download) of the PBX and to restore a particular backup (upload). The latter feature causes the PBX to temporarily drop all its calls on its final switch over to real time implementation.

Features of the Network Portal

1. Synchronizes the state of the PBX to the state defined on the computer server.
2. It downloads (stores) the state of the PBX and keeps a rolling stock of the last 7 copies.
3. It uploads (copies) an existing state of the PBX and reloads it onto the PBX. This means that if the PBX crashes (for whatever reason but a very rare event), using this software, the PBX can be reloaded without the need of an engineer visit.
4. It uploads small changes the user requires for his telephone.
5. Provides a mechanism, called remote programming, where the state of the PBX is sent to the engineer at a remote location so that a technical alteration can be programmed and the result returned to the customer and uploaded to the PBX. This eliminates the need for a special visit from an engineer.

Features of the Handset Programmer Application

1. The user can program his flexible feature control buttons on his digital telephone directly from his PC by using a GUI interface. The GUI interface displays a picture of the telephone on the screen. A particular feature from a list can be "dragged and dropped" onto a specific virtual control button on the screen. This feature is then programmed automatically for the user on the PBX. For features, such as direct station select (DSS), that require extra information, the user is given a choice of valid options rather than being allowed to type in data which is incorrect.
2. At any time, the user can print out a label showing which features have been programmed for which control button (the paper being specially designed for each type of digital phone).
3. Speed-dial rings an encoded telephone number. It allows the personal speed-dials to be created, viewed, modified, deleted or printed and for a user to be able to view and print the system wide speed dials.
4. A user can attach a name (alpha-numeric string) to be displayed on the LCD of his telephone (if the telephone has an LCD).
5. At the system administrator level functions can be applied to all the telephones immediately, e.g. setting the time.
6. The HP will be able to program any form of telephone including digital telephones, plain ordinary telephones (POTs) and "Add-On" modules.

Other Features

1. "Dial by Highlighted number" (or Dial from Text). This feature can read any highlighted number from the screen and the identified number is dialled on the telephone connected via the PBX to the NP from any software application.
2. If a user's telephone line is busy then a message can be displayed on the computer screen beside the phone provided the NP is 'logged in'.
3. A key on one particular phone or a number of phones can be programmed so that upon hitting the key a pre-programmed message could be broadcast to the (telephone and/or computer) screens of all users. This would be particularly useful, for example, to raise an alarm of fire or similar.
4. A person can store their particular telephone details under a name. This information is stored on the system so that the details can be restored to another telephone. This would enable someone such as a sales representative (who is only occasionally on site) to be able to set up a telephone type within the system and be able to 'adopt' any extension while he was on site. Any changes could then be saved for any future visits. It would also be useful for "hotdesking" or when a user's phone has to be replaced, e.g. because of malfunction.
5. Add-on extra flexible feature control button banks may be programmed. These modules are connected to the digital telephone and increase the number of flexible feature control buttons the user can use.

This system provides an easy convenient way of setting up a new telephone system. Prior solutions required an engineer to program the telephone system before it could be used.

Should a major telephone system crash occur (which is extremely rare) then the system can be rebooted via the TDNP and upload the latest stored download.

Furthermore, in contrast to prior systems, the dedicated link (and AD switch) can be disconnected and the two networks, telephone and computer, can continue working independently. If the computer network breaks down, for whatever reason, the telephone network will remain functional and if the telephone network crashes (exceedingly unlikely) then the computer system will continue to function. The dedicated link is based on the TCP/IP protocol so that the PBX and computer server can be placed in separate areas of the company building. This would not be as practical in a prior system.

Figure 2:
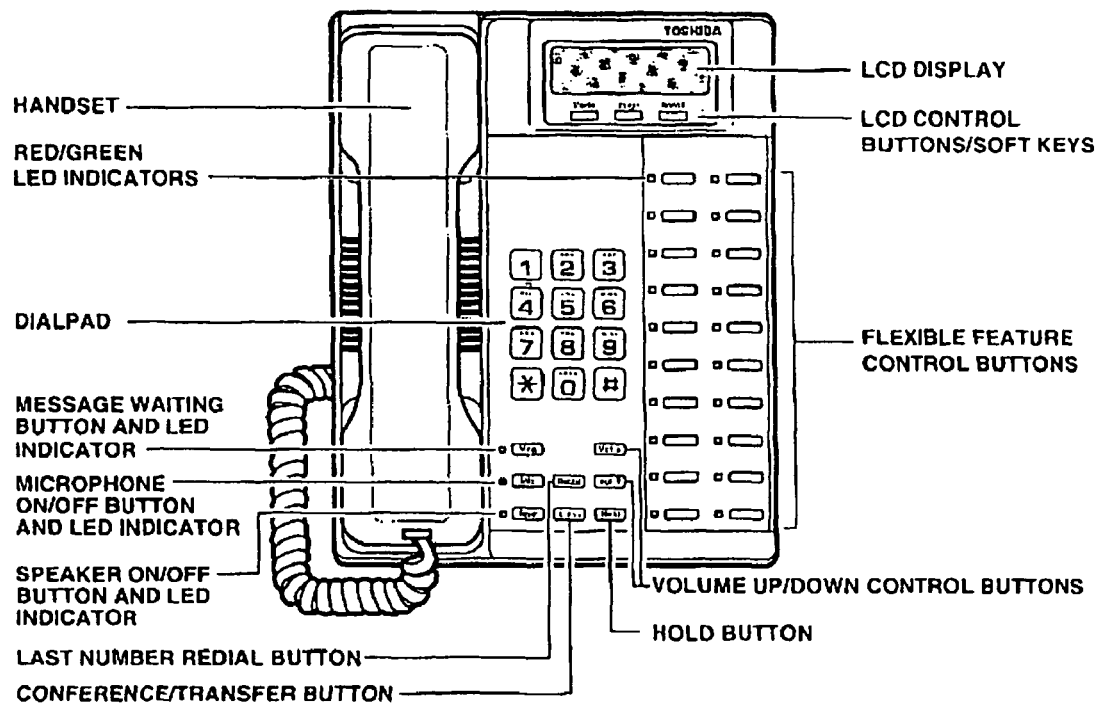
FIG. 2 shows a telephone suitable for use with the present invention.

A typical telephone suitable for use with the invention is shown in FIG. 2. The telephone typically includes a handset, a dial pad, a speaker, flexible feature control buttons, an optional LCD display and various other components as shown in the diagram and as known in the art. A typical telephone may have 10 or 20 flexible feature control buttons, and a typical LCD can display up to 32 characters.

Extra banks (not shown) of flexible feature control buttons can be attached to the digital telephone.

Each telephone can have various items of information associated with it and typically held on the telephone itself. Such information may include for example an alpha tag, a set of defined features and a personal speed dial table.

The alpha tag is any 16-character sequence. This is used to annotate an extension number so that when a particular extension rings then the user can identify who is on the calling telephone.

Each flexible feature control button can be associated with any one of a number of features such as those listed in Appendix 1. Some of the features require specific data to be added, e.g. direct station select (DSS) requires an extension number to be associated. Typically button 1 is the intercom button.

A personal speed dial table of telephone numbers can be defined. The number of speed dials is dependent on the type of PBX.

This package can run on a single PC computer or alternatively on any typical PC computer network where at least one computer is designated the server and the others clients. The operating system is immaterial but the current example has been implemented for a 32-bit operating system e.g. Windows 95, Windows 98, Windows 2000, or Windows NT 4.0.

Figure 3:
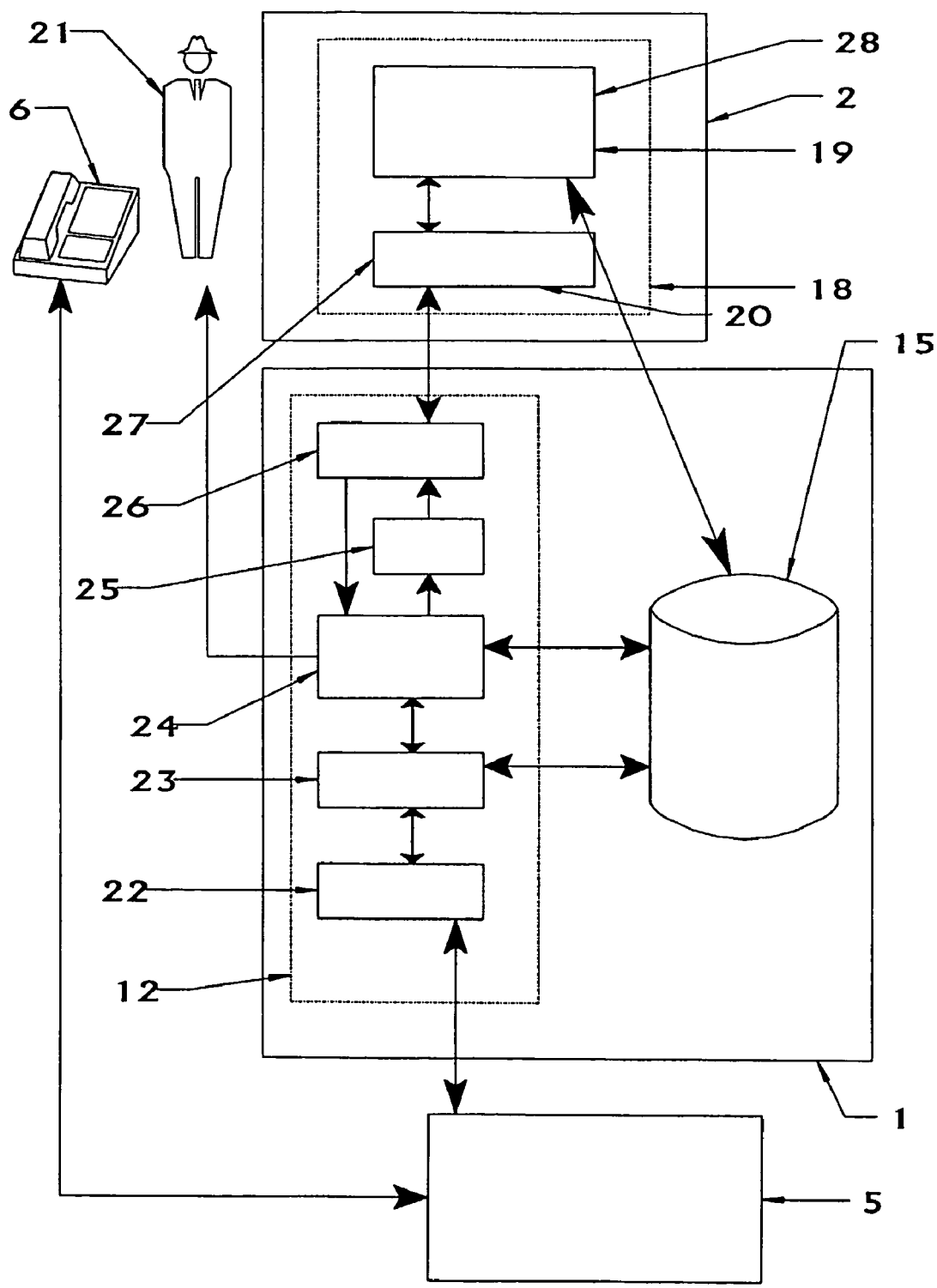
FIG. 3 shows details of a system embodying the invention in more detail.

The architecture and operation of the network portal will now be described with reference to FIG. 3. In operation, the network portal software 12 communicates with the PBX 5 and holds a copy of the information stored on the PBX and stores it in the data store 15. An individual copy of the Handset Programmer 18 resides on each client computer 2. The Handset Programmer 18 ensures that for each feature that the user programs for the individual telephone 6 the correct sequence of codes is sent to the PBX 5 via the network portal 12. The more advanced features, which affect the overall PBX (and can only be accessed by particular levels of user), are essentially a particular sequence of codes. The features and sequence of codes are totally dependent on the type of PBX 5 but this generic architecture can be adapted specifically for each type of PBX and also for the type of operating system the computer network is running. Since the operation of programming the PBX is automated using a GUI, the potential for human error when typing in a sequence of codes is eliminated. Furthermore, as discussed above the handset programmer will not allow an illegal program to be entered, such as attempting to associate certain features with more than one flexible control button per telephone, which may cause the system or features to stop working.

The data store 15 is held on the server 1. The data store contains several different types of information, such as PBX specific information, features information, access level information, a complete system dump, individual telephone settings, a system speed dial table, personal speed dial tables and group pickup table information. These information types are held separately as the operations within the NP and HP do not need all of it at any one time.

The Network Portal 12 is the software package that resides on the server 1. Its main tasks are to ensure that the data store 15 and the PBX 5 are consistent, to serve the requests from the clients' HP applications 18, to prevent any information being sent to the PBX 5 if communication is broken between the PBX 5 and server 1 and to disconnect a client 2, 3, 4 from the PBX 5. If the network portal is to be shut down, for example, then all of the clients 2, 3, 4 need to be disconnected before the network portal 12 can be closed.

According to the particular embodiment discussed, the request information is passed between client 2, 3, 4 and server 1 as a string. A string has the format: command name; arg1; arg2; . . . ; argn where the command name is either one or more characters and args can be any length separated by a ';'.

An MSComm event handler 22 is connected to the PBX 5. Its function is to oversee communication between the computer server 1 and the PBX 5 via the dedicated link. Because the COM port is used on the server 1, the messages observe the TCP/IP protocol. The event handler 22 can detect when the link has been disconnected so that it can prevent (i.e., queue) any requests being processed until the link has been reconnected.

The line has three states: idle, busy or logged off. When the line is in the idle state, the event handler 22 uses a timer to send a carriage return down the line to see if it is still connected. If it is not then the state becomes logged off. The state is set to busy from idle when the PBX is either being programmed or checked to see if the altered program has been stored correctly.

The PBX 5 does not respond with an acknowledgement of what it has just done. Actions can only be verified if the appropriate query is made at a later time to see if the PBX 5 knows about the change. For most programs, if the PBX is sent an incomplete program then it returns the current value. This can then be compared with the expected value to ascertain whether it has been stored successfully or not. For other cases, certain modes make the PBX 5 yield its information. This information can be searched to ensure a request has taken place. If the request has not been implemented then it is made again and a query is again made later to check the request has been completed.

An important function of the event handler 22 is to verify whether the program has been updated. As discussed above, some PBXs do not automatically confirm whether an update has been successful (note: the term program used here is equivalent to a function name followed by a set of parameters). For example, when updating a change for a flexible feature control button, the validation stage sends the PBX the program number, the logical port number and the button number. The PBX returns the program number, the logical port number, the button number and the feature number. The feature number can then be compared with the proposed changed feature number. If it is the same then the PBX has implemented the change, else it has not. There will always be a way of finding out from the PBX whether the information has changed or not.

The general concept for validating if the program has been updated correctly, if the PBX does not return a success value is:
1. wait until (line=idle)
2. ask PBX relevant question
3. the PBX returns an answer
4. if (answer=expected answer) return success, else return failure The Network Portal 12 contains a further series of components 23, 24, 25, 26. These are the Ques 23, the Network Portal Control 24, the WinSock Que 25 and the server WinSock software 26.

The Ques 23 is a standard FIFO (first in first out) queuing system. All requests to the telephone system are put into the Ques 23. The head of the queue then links itself to the event handler 22. The principle of operation of the Ques is as follows:
1. Is the link there?
2. Is there any traffic—if no then have session
   if yes then queue
3. Is anyone else in the queue—if no mark as head of queue
   if yes—add to queue and keep looking to see when it becomes head of queue
4. When head of queue go to 2 and look to see if there is any traffic.
5. Before session ends must have confirmation that request has been implemented.

The Network Portal Control 24 operates as follows. Each client 2, 3, 4 is required to 'log in' to the network portal 12 so that it can be given a particular WinSock identifier. This identifier can then be used to know from where the incoming request is coming and where to return either a message or result. The network portal control software 24 interprets each request from the clients into a particular process. There are three types of processes:
1. To retrieve information from the data store 15 (some of these requests do not come via the network portal control software 24 but come directly) and send it back to the particular client 2, 3, 4.
2. To send the message direct to the PBX 5 via the Ques 23 and tell the client 2, 3, 4 whether it was successful or not via the WinSock Que 25.
3. To retrieve further information from the data store 15 that can be added to the message before being passed to the Ques software 23 and then informing the client 2, 3, 4 the success of the operation via the WinSock Que 25.

The main tasks of the WinSock Que 25 are to know which clients 2, 3, 4 are logged into the network portal 12 and to handle a FIFO queue of messages, each message defining to which client 2, 3, 4 the message has to be sent and the necessary information to be sent. The WinSock Que contains two types of information: a list of connected clients and a queue.

When a client tries to connect with the network portal, the WinSock Que allocates the client a WinSock identifier and stores this information with the connection identifier in the list of connected clients. The WinSock identifier is then used to send messages back and forth between the HP and NP software.

The queue works in a similar manner to the Ques queue:
1. Message added to queue
2. Is anyone else in the queue—no—mark as head of queue
   yes—add to queue and keep looking to see when it becomes head of queue
3. When at head of queue send message.

Messages from the client to the server are passed through the server WinSock interface 26, which is the message passing system from the server to a particular client. It requires a queue so that only one message is passed at a time and in an orderly manner.

The handset programmer HP software 18 will now be described. The HP software 18 runs on each client computer 2, 3, 4. The HP is driven by a GUI interface 16 (FIG. 1). There is an initialisation wizard that runs the first time the software is used so the user can set his log in name and password. This is typically just for the level User. The System Administrator, Technical and Engineer/Dealer user names and passwords are fixed in the database. As an added level of security, an access key is also required for the Engineer/Dealer access level.

The Handset Programmer Control 28 handles the GUI interface. Essentially when a button (including the flexible feature control buttons) is chosen it triggers a particular event. Each event maps to a particular function that will eventually be sent to the network portal via the client WinSock interface 27 after all the relevant information has been gathered (the act of logging out causes the buttons to be 'greyed out', thus preventing them from being selected so stopping events being sent when not connected).

The client and server WinSock interfaces 27, 26 are a standard Microsoft TCP/IP client/server application.

When using the HP 18, the user is required to log on. The log on user name indicates the level of user, i.e. user, system administrator, technical, engineer/dealer. As an added security measure, the program allows a limited number of attempts, typically five, at logging in before terminating.

Figure 4:
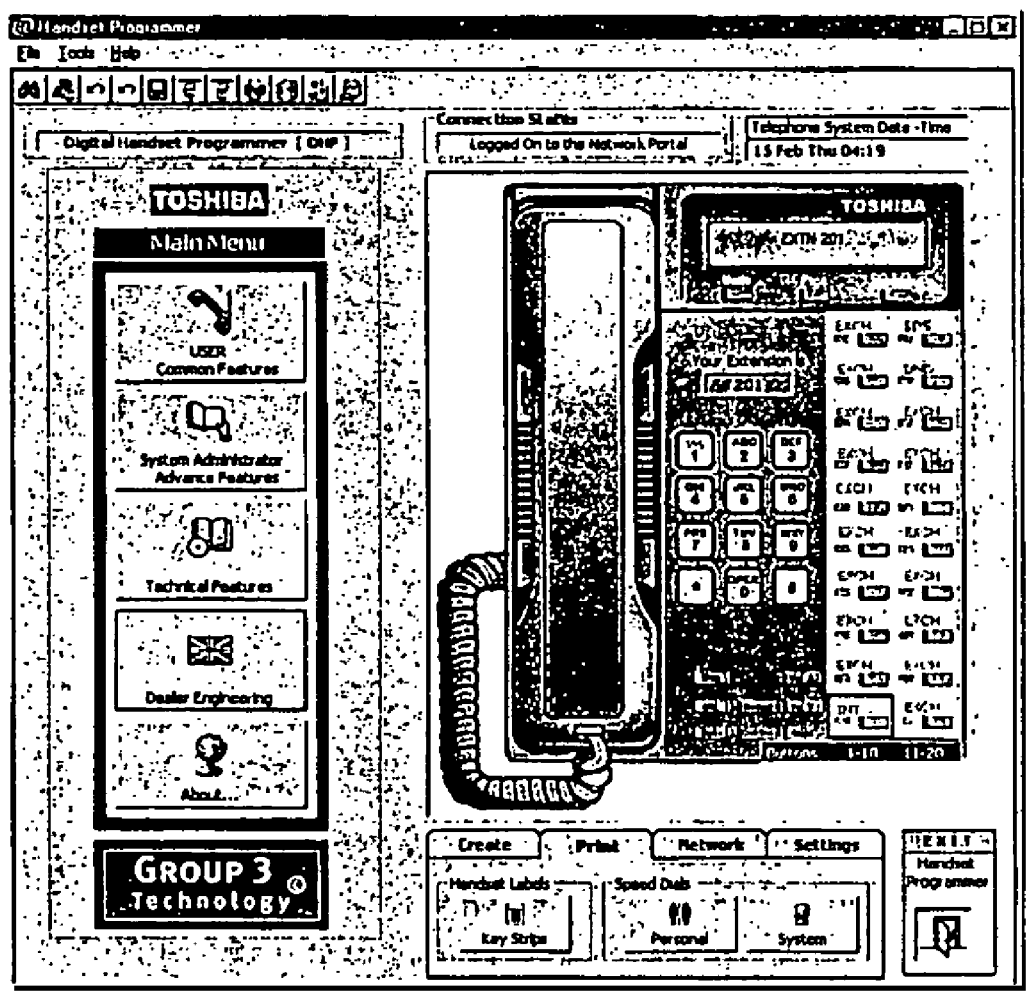
FIG. 4 shows the Handset Programmer (HP) main screen.

When the user has successfully logged in, all the current information about the allocated telecommunications device (for example, telephone 6) is retrieved from the server, such as speed dial table and flexible function control button information (a copy is made of this information so a user can always undo any changes up to a previous save or login). The HP 18 also fetches the complete list of features/commands that are available for this particular access level. On the main screen GUI interface (see FIG. 4) there are five boxes under the main menu box. The boxes are User/Common Features, System Administrator/Advance Features, Technical Features, Dealer Engineering and About.

Figure 5:
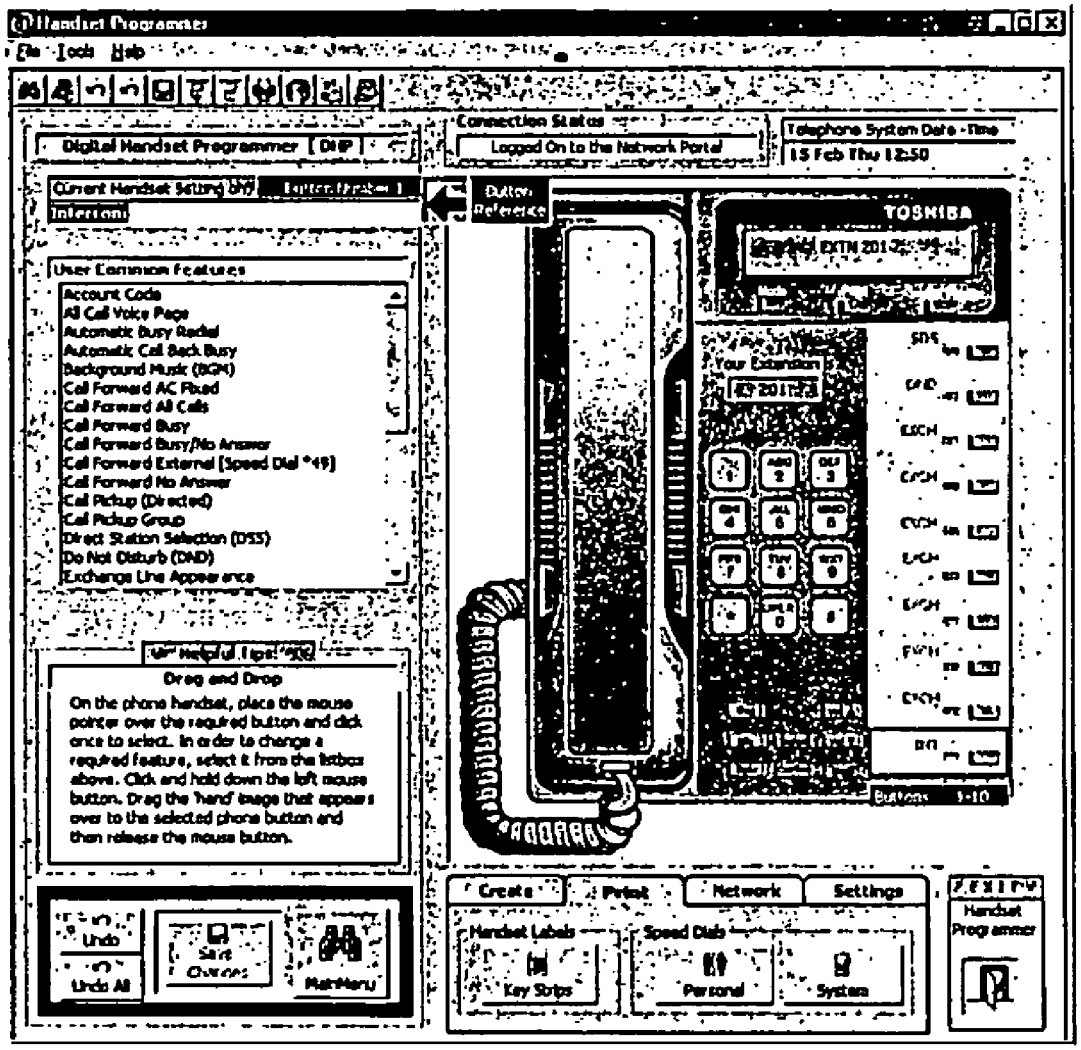
FIG. 5 shows a screen displaying user features of the Handset Programmer.
Figure 6:
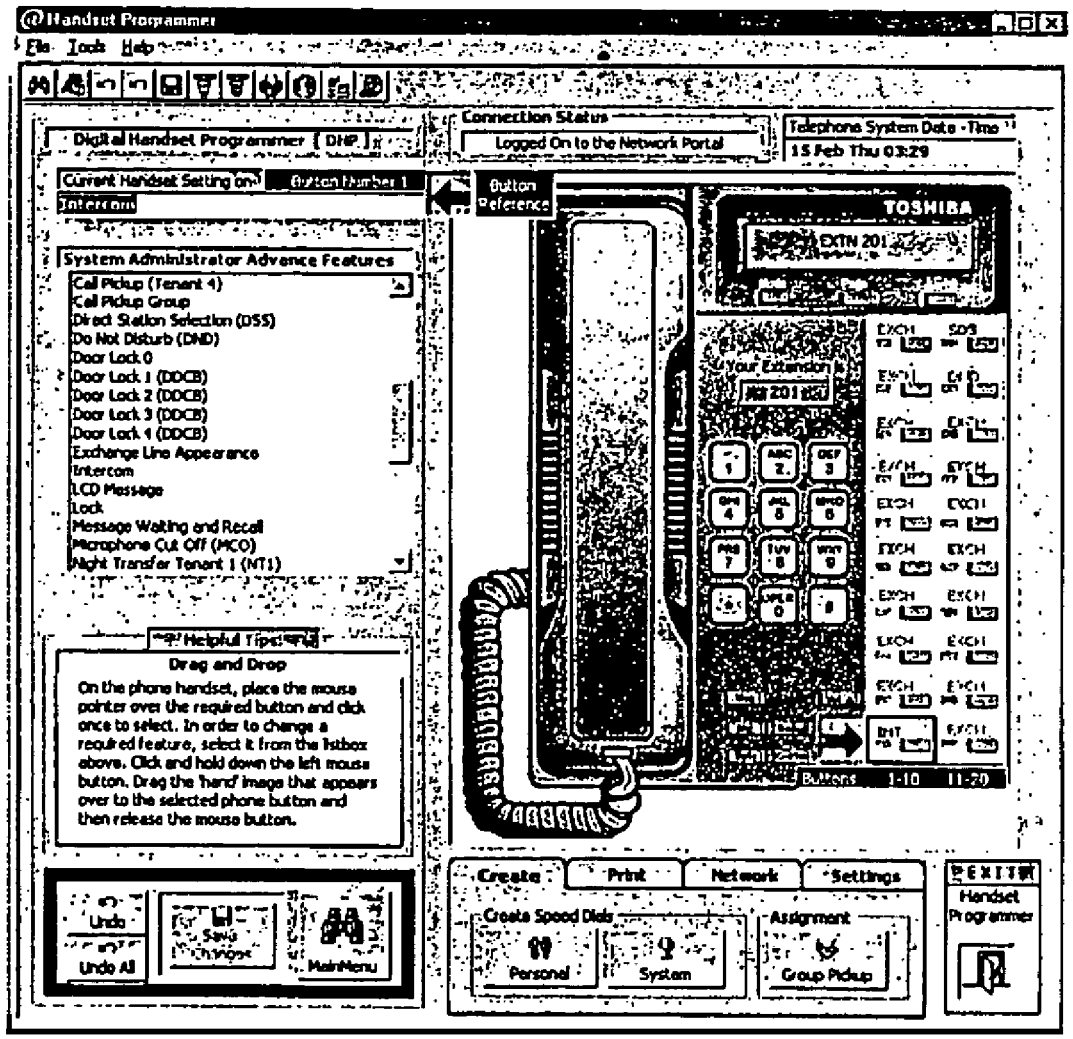
FIG. 6 shows a screen displaying System Administrator features of the handset Programmer.
Figure 7:
FIG. 7 shows a screen displaying Advance Technical/Engineering features of the Handset Programmer accessed via "Technical Features" button in the HP main screen.
Figure 8:
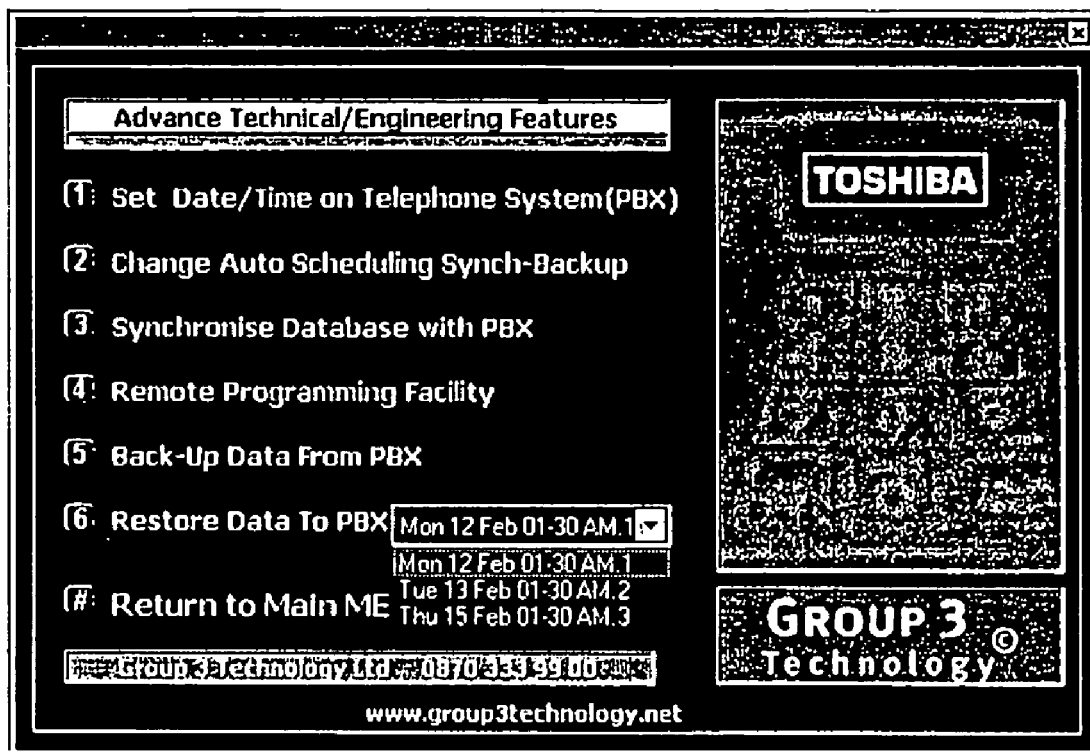
FIG. 8 shows more options relating to Advance Technical/Engineering features accessed via "Dealer/Engineer" button in the HP main screen.
Figure 9:
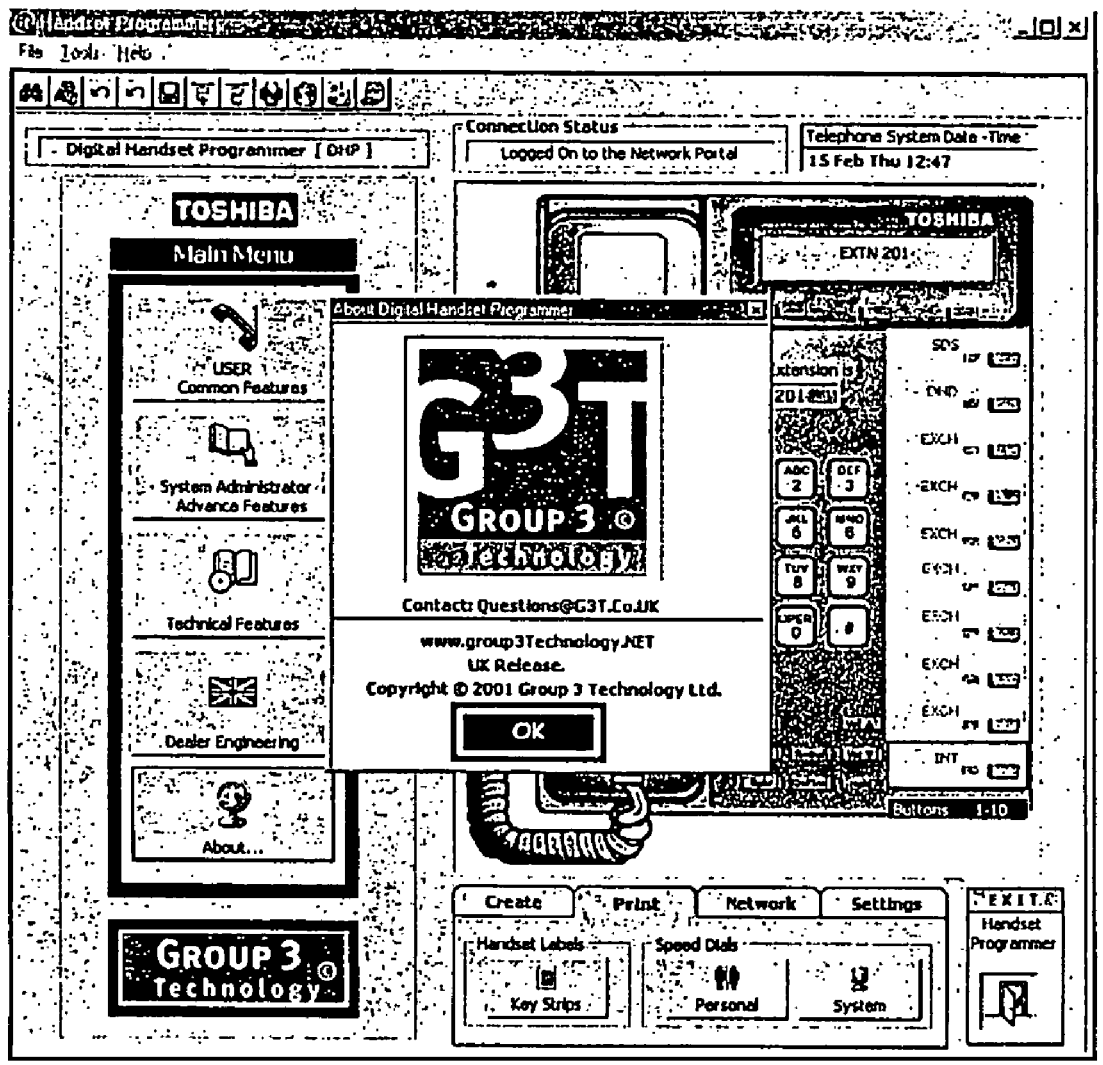
FIG. 9 shows the About screen.

The complete list of features is sorted into two lists: ones that can be used at the user level (see FIG. 5) and ones that can be used at the System Administrator level (see FIG. 6). The technical level menu shows the extra features for this access level (see FIG. 7). The engineer level shows the extra features allowed beside the extra technical features (see FIG. 8). The About button gives information about the package (see FIG. 9). Because of the way in which GUI interfaces work, the main screen is not displayed until the entire information gathering is complete.

At this point the information held on the client 2, 3, 4 is:
1. List of features that can be programmed at this level.
2. List of tips (one for each feature and accessed via command code number).
3. List of control buttons and their associated feature (i.e. command code).
4. List of personal speed dials.

The main screen GUI interface then drives what the user is permitted to do. When features are not permitted at this access level, the option is 'greyed out'.

Figure 10:
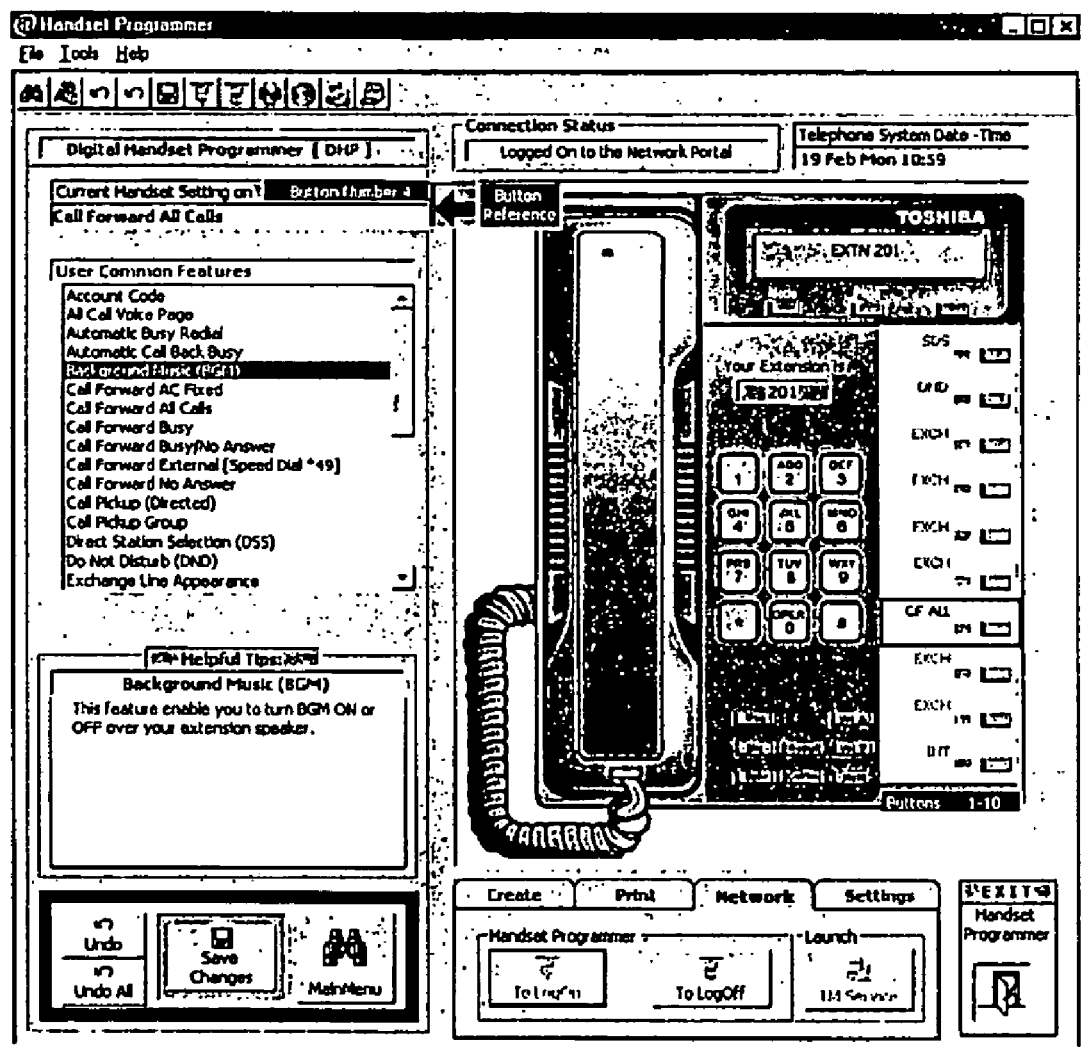
FIG. 10 shows a screen displaying the operation of programming the Flexible Feature buttons.

To program the flexible feature control buttons (see FIG. 10), the user needs to select a button. The interface highlights the button and uses an arrow to point to it. The current feature setting is shown in the current Handset setting box. The user then chooses a feature out of the common feature list and drags it to the selected button. The label on the button will change as will the information in the current Handset setting box. The alteration can then be saved or undone by clicking on the appropriate button found at the left bottom. FIG. 10 shows the screen that displays all the information to enable the user to program a flexible feature control button. In practice, the button to be programmed is highlighted. The current programmed feature is displayed. A help tip on how to do this operation is also displayed. When a new feature is selected, the help tip is changed to show what the feature does.

To program the speed dials (both system and personal) the CREATE tab has to be selected. A box (not shown) then appears giving the user a choice of selecting either the PERSONAL button or the SYSTEM button.

The box also gives the user a choice of pressing the GROUP PICKUP button, which allows the user to program the group pickup table.

To print various items of information, the PRINT tab has to be selected. The user is then given the opportunity of pressing a KEY STRIPS button (not shown) which allows a label to be printed for the flexible feature control buttons. The user may alternatively wish to print the speed dials (either system or personal): this can be achieved by selecting either the PERSONAL button or the SYSTEM button (not shown).

To log on to and log off from the network portal the NETWORK tab has to be selected and then the user can select either a LOG ON or LOG OFF button (not shown).

To log on as another user (which requires at least System Administrator access level) firstly a user must log off from the network portal then change the properties by choosing the SETTINGS tab followed by the PROPERTIES button (not shown). Finally the user logs in using the NETWORK tab and LOG ON button.

The HP GUI interface 16 (FIG. 1) displays a virtual copy of the telephone on the desk and therefore displays the features that have been assigned to the flexible feature control buttons. Normally a user would have to write on the telephone what feature was programmed for that control button. Using the invention, it is possible to print out a label to place over the buttons to show the current programmed state.

It is possible to print the label onto normal paper, but it is preferable to use specifically-designed labels so there are holes for the buttons. A typical label layout gives 4 labels per A4 sheet, the labels being laid out so that only one label need be printed one at a time on a local printer. The A4 sheet can be flipped over so that partial sheets of labels can be fed into the printer via a sheet feeder. The preferred labels are printed on paper with perforated holes and cut lines.

Other items of information that can be printed out are the system and personal speed dial tables. Some telephones have special drawers or recesses for the storage of such printed tables. Conveniently, the printed table may be formatted so as to fit into such a drawer or recess. Using the PRINT tab of the main screen and the appropriate button, the user can print the appropriate table on a local printer on standard A4 paper and cut it to size. On some PBXs there is no way of being able to output the speed dial tables. Only by trial and error can the user establish what the tables are and, if an engineer does not document how the tables are set up, this information can be difficult to determine. On more modern PBXs, this information is available via the LCD of a digital telephone. However, a system according to the current invention allows easy display and output of such information.

In the event an engineer is required to carry out (complex) programming procedures, there are several ways in which these procedures can be programmed into the PBX 1) The engineer can connect his laptop computer 11 (FIG. 1) via the AD switch 10 directly to the PBX 5.
2) The engineer can terminate the NP software 12 on the server 1 and can launch a standard software hyper terminal. He can then use the server COM port (to which the dedicated line is attached), or a USB port, to program the PBX 5.
3) A remote programming facility can be used. The process is divided into distinct stages.
   a) The technical officer (office service manager) will advise the engineer of the particular programming task required.
   b) A copy, for example an encrypted copy, of the latest download from the PBX is sent (e.g., by e-mail or post) to the engineer.
   c) The engineer can then produce a partial upload of all the changed programs for the customer's PBX.
   d) This can be encrypted and sent back to the customer (e.g., by e-mail or post).
   e) The technical officer can then upload the changes to the PBX.
   f) A power cycle then needs to be implemented for these changes to be effective.

A copy of the working memory of the PBX is distributed across a number of tables stored in the data store 15. There are various different types of tables, including programs, telephones, personal speed dials, system speed dials, group pickup, access levels, processor. The stored information represents PBX-specific data, PBX state data, network-specific data etc. Full downloads of the PBX working memory are stored in a particular place, for example as encrypted text files. They may also be downloaded to a separate storage device 17.

On the data store 15 there is a table that contains all the programs that can be altered with the TDNP. This table is only a subset of the full download. The only way to alter the other programs not included in this set is to either use the remote programming feature or by an engineer directly accessing the program(s). The next complete download would store these changes.

Also on the data store 15 is the telephones table, which is a table containing all the active logical ports. Each logical port has an extension name, alpha tag, phone type and a list of features assigned to the flexible feature control buttons. The list of features is the same length as the number of flexible feature control buttons. The list starts with button number 1 and continues in sequence to the maximum button. There must always be one feature defined for each button. When a new logical port is activated and assigned a particular telephone type then it will automatically be initialised with a list of features to match this telephone type.

Also present is a system speed dial table. A speed dial defines a number to identify itself, an alphanumeric tag to show a meaningful name and a number that is either an internal extension number or an external telephone number. The size of the system speed dial table is dependent on the information held in the processor table. Not all of the speed dial numbers have to be used. Only active system speed dials are stored.

Similarly, there is a personal speed dial table. For each active logical port a corresponding speed dial table may be defined. The information held is the same as for the system speed dials, i.e. each speed dial defines a number to identify itself, an alphanumeric tag to show a meaningful name and a number that is either an internal extension number or an external telephone number.

Group Pickup information is also stored as a table on the data store 15. The PBX defines the number of group pickups allowed. The group pickup information is stored by specifying the information per active logical port (note: the GUI interface translates the logical port name to its extension name to make it more understandable). Each port has an array whose length is the same as the maximum number of groups. Each index of the array corresponds to the group identifier as groups are numbered starting from 1. The contents of the index are set to either 0 or 1 to indicate whether the port is included in the group or not. This mechanism prevents a port being duplicated within a group.

A table is also provided containing Access Level details. This contains the specific names and passwords for the levels other than the User. The user password is stored in the local client's registry. The other access level passwords are general and have to be stored on the server as any client can have the ability to log in with one of these levels. Multiple clients should not use certain features at the same time, e.g. modifying the group pickup table. The network portal can spot this potential problem and give a user a warning message if someone else is currently using this feature. The user need not observe the warning and therefore may not get the desired result but the PBX will not be in an invalid state. This allows a system administrator to be logged in on more than one client at a time.

A processor table contains information on the type of PBX and two parameters that determine the number of speed dials and the number of group pickups allowed.

Operation of the Network Portal 12 will now be further described. On initialisation of the Network Portal, it assumes a particular port number. This port number (name) is the TCP/IP port address used by the WinSock Que 25 under the Windows operating system. If there is a clash then the number can be changed via the GUI. A note must be made of this number, together with the server name (host name). The host name and port name are vital parameters that are used by the HP to 'log on' to the server.

Figure 11:
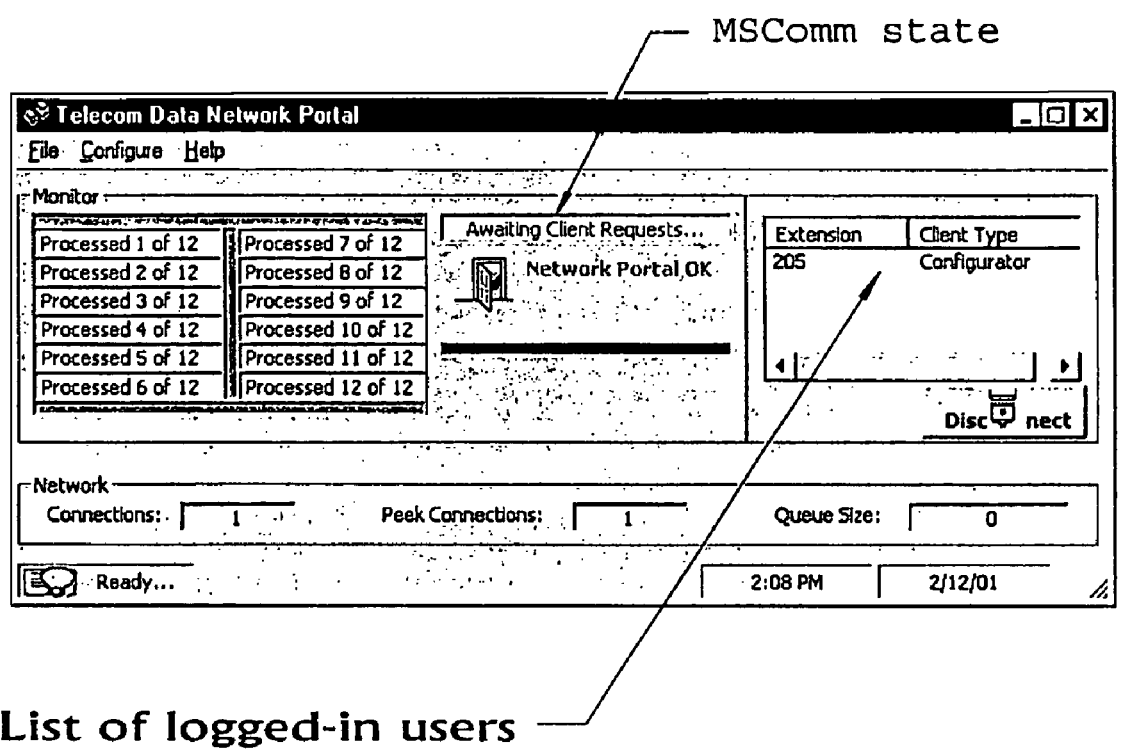
FIG. 11 shows the main network portal screen.

The main network portal screen is shown in FIG. 11. The primary task of this screen is to show what is happening (analogous to Task Manager on a Windows operating system). It shows 1. Who is logged onto the server 1.
2. The state of the event handler 22 (whether there is a connection between the PBX 5 and computer network 1, 2, 3, 4, or not).
3. If there is a PBX download in progress. If the line becomes disconnected then the screen shows a warning message (see FIG. 11). The software allows one feature to be activated—to disconnect a client.

Figure 12:
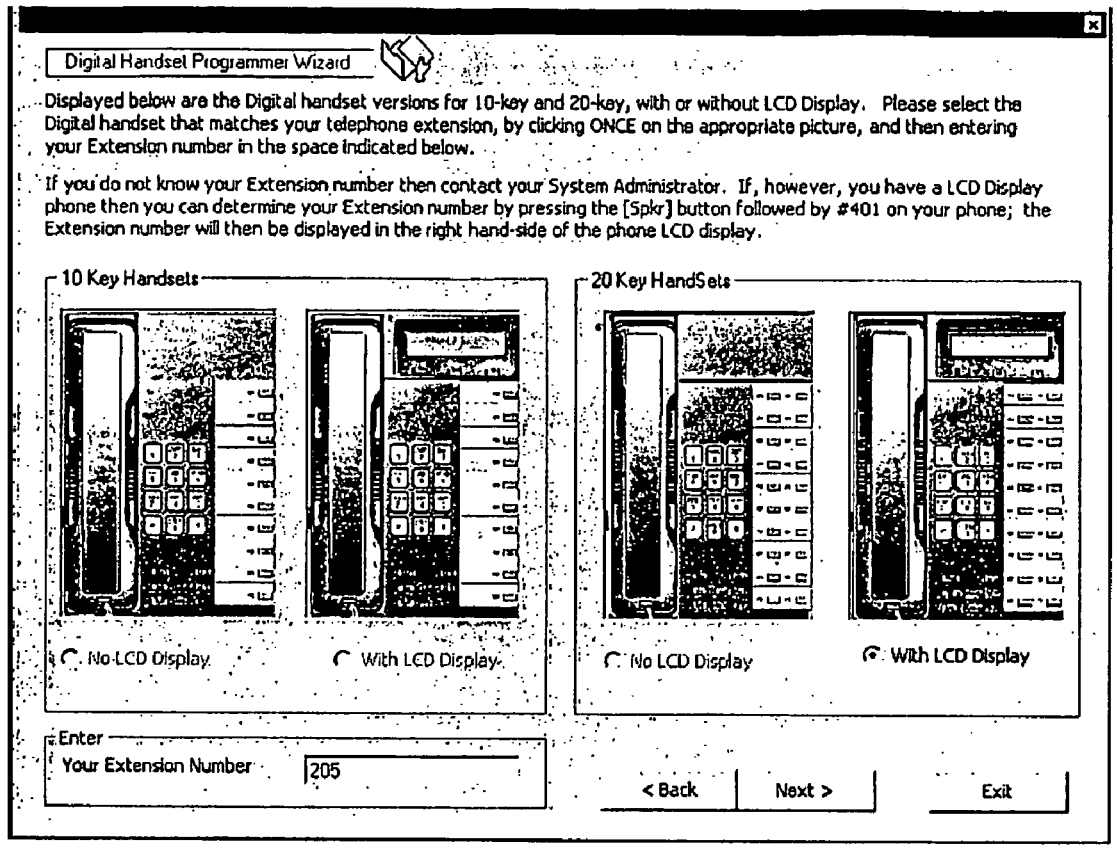
FIG. 12 shows a screen allowing selection of a type of telephone.
Figure 13:
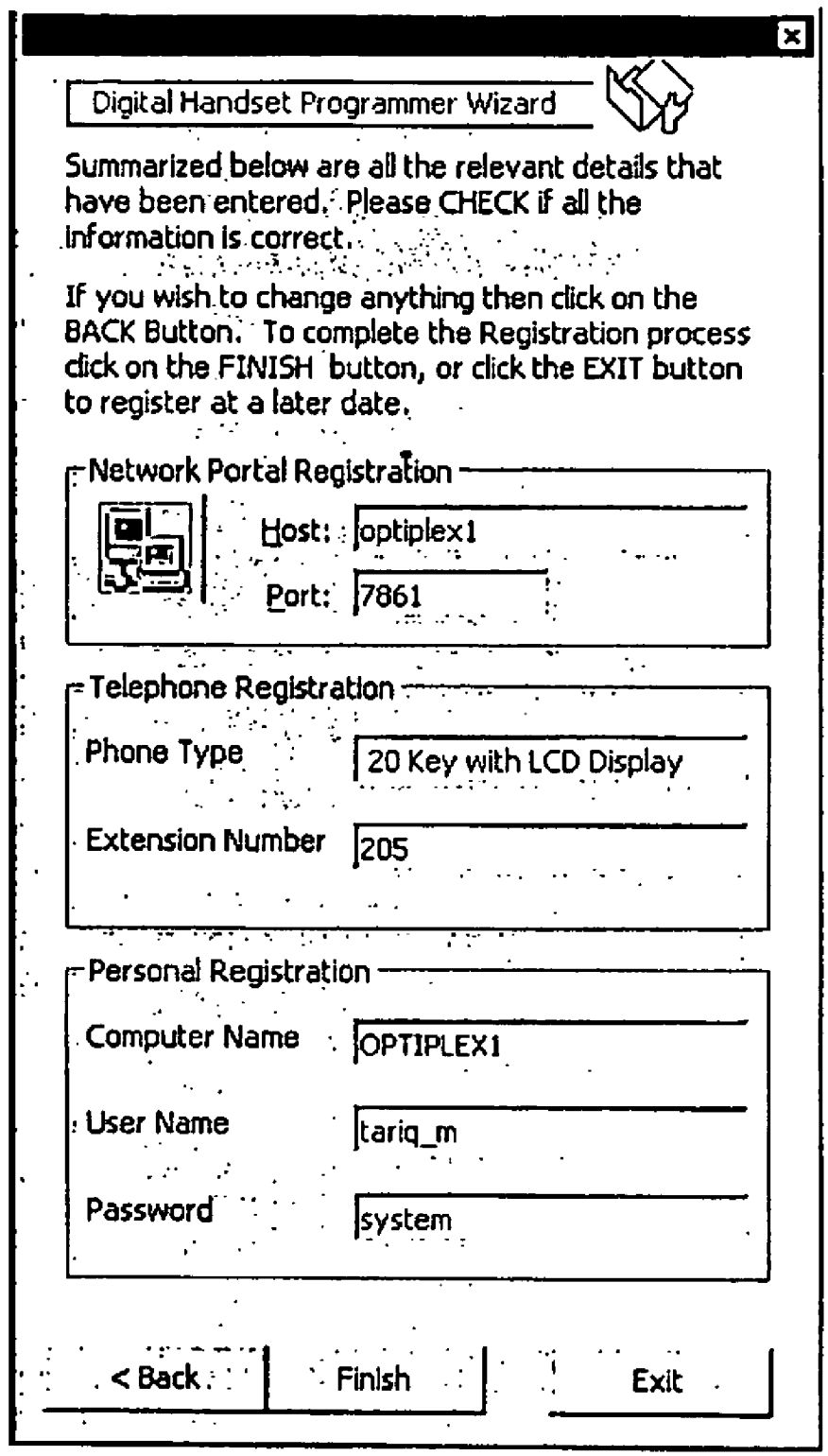
FIG. 13 shows a screen displaying the information entered using the HP wizard.

Initialisation of the Handset Programmer is conveniently performed using a Wizard, as follows. The wizard renders initialisation of the HP a task readily performed by a user without the need for administrator or engineer intervention. The wizard includes the following steps:
1. Launch the Handset Programmer Wizard
2. Obtain network portal details. The user inputs the Host Name and Port number.
3. Select type of digital telephone (see FIG. 12). The user is required to input the extension number and select the telephone type.
4. The next form asks for the log in details. The user is required to input the Host Name, User Name, Password and to confirm the password is correct.
5. The final form shows all the details of the registration (see FIG. 13). An answer "yes" at this point stores the relevant information.

The main routine is structured into the following sequence.
1. The user logs in successfully
2. The access level is set and the feature information for the access level is retrieved from the server.
3. The information for the particular extension is retrieved from the server.
4. The information is manipulated to suit the manner in which it is to be displayed via the GUI interface. Whether the user is logged in and the access level both determine whether a button is 'greyed out'.
5. The main screen is then loaded.

From this point the PBX can be programmed by using the standard GUI object-oriented technique of a case statement, which includes each particular event that can occur, embedded within a repeat loop until the EXIT event is chosen.

The GUI interface of the telephone has a virtual grid placed over it. The array of buttons belongs to the telephone. The position of a button relates to the actual button number. The LCD (if the telephone has one) displays the alpha tag if defined or else it displays the extension number. The program is now controlled by a series of events that are related to the mouse clicks by the user. The object-oriented code automatically converts the position of the mouse click to a particular object and a particular event. Each anticipated event for each type of object is associated with the code necessary to perform the expected function.

The events are:

| Event Type | Action |
|---|---|
| USER FEATURES | see description below |
| SYSTEM ADMINISTRATOR ADVANCE FEATURES | see description below |
| TECHNICAL FEATURES | see description below |
| DEALER/ENGINEERING FEATURES | see description below |
| ABOUT | displays information until user closes screen. |
| CREATE | Shows 4 buttons as discussed above: Personal Speed Dial, System Speed Dial and Group Pickup. Described in further detail below. |
| PRINT | see description below |
| NETWORK | logs user off/on. |
| SETTINGS | Shows 3 buttons: Settings - allow system administrator or above to change extension number. Must then log out and log in before it takes effect. Password - change password for access level |
| | Access Key - change access key only for engineering level Date + Time - see below. |
| EXIT | log out from network portal and stop the application. |

The log-in sequence proceeds as follows:
1. Draw start-up screen (not shown).
2. Repeat:
   a. Display Login form (not shown). The user inputs the User Name and Password (note that for a user logging in at the user level the password is stored in the client registry whereas for the higher levels the password is stored on the server).
   b. If (access level==USER) verify password from client registry.
   c. Else verify (access level, password) on server.
3. Until correct or $5^{th}$ time.
4. If still not verified then stop.
5. Else set level permission flag.

The feature or commands information is specific to the type of PBX and is stored on the server. This information is fetched from the server and sorted into two lists. One list is used for the User features and the other is used for the System Administrator advance features. The advance features list is the complete list, whereas the User list is a subset. The technical and engineering features are determined in the client software.

The specific extension telephone information is retrieved from the server as follows:
1. Connect to server.
2. Request key mappings giving extension number and type of telephone.
3. Server returns a string containing the list of key mappings.
4. Create two lists: one as the original and one for the current.
5. Load the lists with the key mapping information.
6. Request active extension set.
7. Server returns a string containing the list of active extensions.

A series of manipulations then takes place as follows:
1. Create map from logical port name to extension name (the GUI needs to display the extension name but the data is stored via the logical port name).
2. Associate command to each flexible feature button.
3. Set connection set to connected.
4. Attach label to each flexible feature button.
5. Add tool tips.
6. Draw main GUI interface (see FIG. 4).

To program the flexible feature control buttons a sequence of events is required as follows:
1. Mark the button to be programmed.
2. Select a program from the user common feature if access level=USER else from the System Administrator Advance Features.
3. Using the mouse, drag the feature to the button.
4. Map feature to button, update label of feature to button then redisplay main form.

A button is always marked/highlighted. A feature is always loaded with a default. The user can change either the button selected or chosen feature. The event of 'dragging' the feature to the button causes the alteration in mapping.

There are several events that can be triggered at this point.

| | |
|---|---|
| SAVE | saves the mapping information by sending the updated key mappings information to the server and therefore to the PBX. |
| UNDO | undoes the last mapping. |
| UNDO ALL | copies the original mappings to the current mappings. |
| MAIN MENU | return to GUI main screen |

For the special features that require extra information there is an additional step between 2 and 3. There is a pull down box that allows the user to select the appropriate information. For example, in using the DSS feature (see Appendix 1), the user must select an extension number before he can associate the feature with the flexible function control button.

Figure 14:
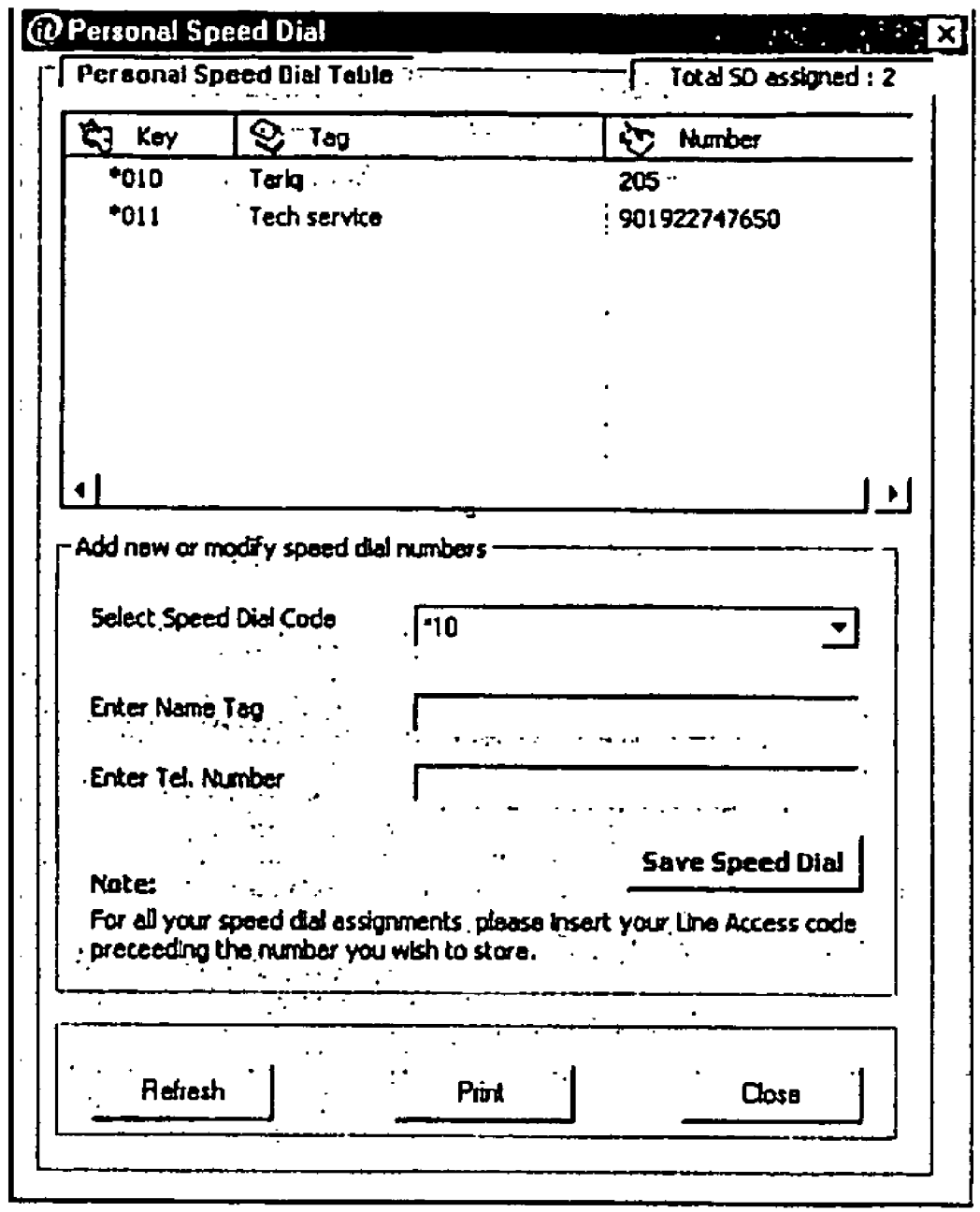
FIG. 14 shows a personal speed dial screen.

The user can change his personal speed dials or the System Administrator can change the system speed dials or a particular personal speed dial. FIGS. 14 and 15 show system and personal speed dial screens respectively. The same object type is used for both, but each instance is customised either for a personal speed dial table or the system speed dial table. Three fields define a speed dial table: number, name and key. The table can be sorted by any of the columns and the columns of the table can be swapped over. There are four possible events: SAVE, REFRESH, PRINT or CLOSE.

SAVE takes the information input from the user and updates the table and sends it to the network portal via WinSock. WinSock Que will return the success of the save. If the save is successful then the table will be automatically refreshed.

REFRESH for personal speed dial retrieves the logical port number for this extension from the Telephones information from the server. It then fetches the particular personal speed dial table for this logical port from the network portal data store. It then displays the table.

REFRESH for system speed dial fetches the system speed dial table from the network portal data store. It then displays the table.

The PRINT function carries out the same request to retrieve the appropriate speed dial table. It then sends the information to a special report generator that prints out the table. The report generator marks the shape of the table so that it can be cut to fit into the special telephone drawer (see FIG. 16).

The CLOSE button closes the window and saves any information if required and not already saved.

Figure 16:
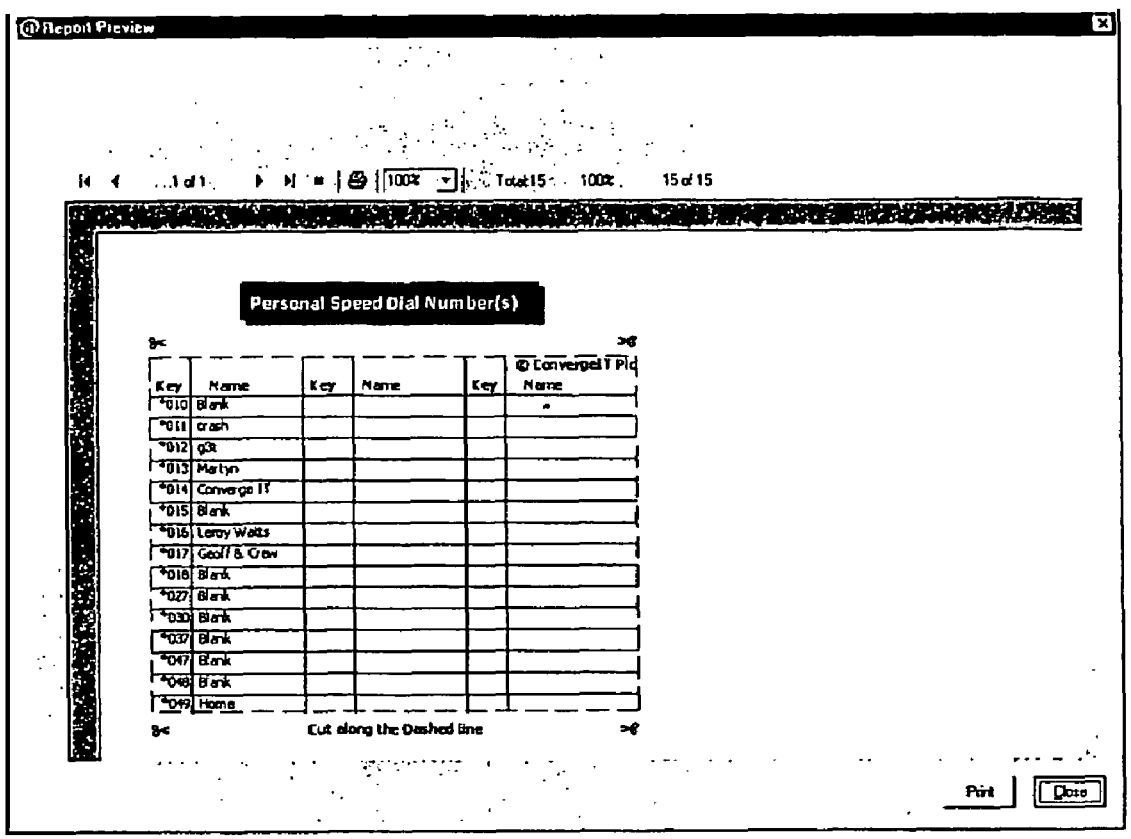
FIG. 16 shows personal speed dial tables to be printed out.

The print speed dial tables use the same code as for the print function from the speed dial window (see FIG. 16).

The print key stubs use the information held in the Telephones for this particular logical port. The information is manipulated into the correct form for the special report generator to print onto the special label paper.

Figure 17:
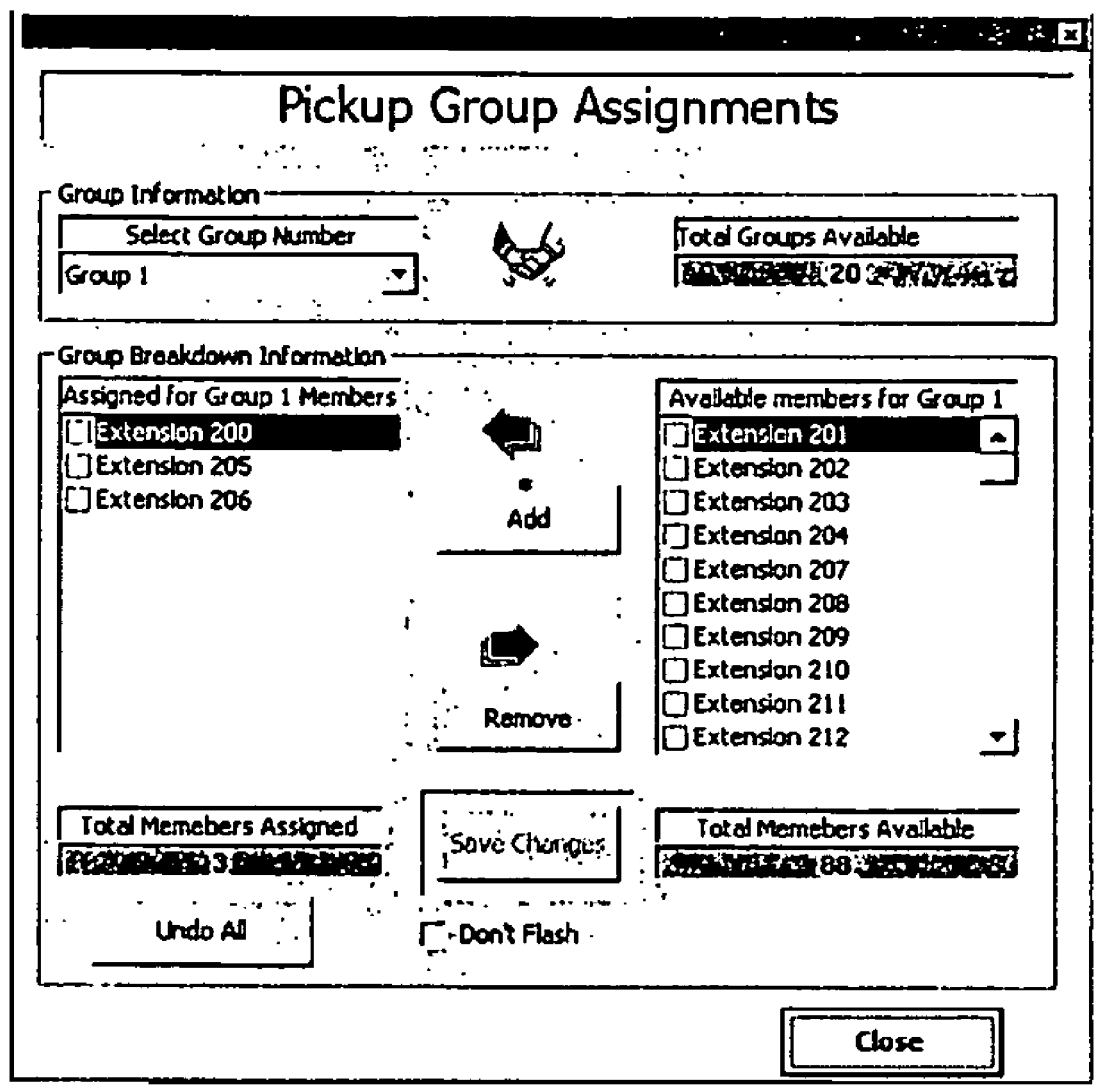
FIG. 17 shows a Pickup Group Assignment screen.

FIG. 17 shows the main screen of the Pickup Group Assignments. This is first launched when the CREATE tab and Group Pick Up button are selected. The screen displays the group information on the left hand side and the possible active extensions on the right hand side. It is important to bear in mind an extension can only be assigned once to a particular group.

The high level procedure is:
1. Get list of active extensions from network portal.
2. Get group pickup information from network portal.
3. Translate information to table of ports and their group pickup information.
4. Take a copy of the table.

When the extension name is highlighted and the ADD button or REMOVE button clicked then the group pickup information is scanned to check to see if the port can be allocated or de-allocated for this group.

When the user selects the SAVE button then the information is sent back to the network portal software and stored in the group pickup data store and sent to the PBX.

If the UNDO button is clicked then the copy is copied to the working copy and the screen refreshed.

Technical and Engineering features will now be described. There are six defined features to choose from (only four if at the technical access level).
1. Set Date and Time.
2. Change auto scheduling.
3. Synchronize database with PBX.
4. Remote programming.
5. Backup data from PBX (download).
6. Restore data to PBX (upload).

To set the date and time, the user inputs the new values and these are encoded into the appropriate PBX program and sent to the network portal which in turn sends the data to the PBX. All the digital telephones, which have LCD displays, are then automatically updated with the new date and time.

Remote Programming is a three-part process as follows:
1. Retrieve the current state of the PBX and send it to the engineer.
2. Restore the amended data to the PBX.
3. PBX disaster recovery for emergency use only.

The first part causes a specific download file to be sent (e-mailed) to the engineer together with a message confirming the changes that are required and, if appropriate, the type of payment.

The second part loads the file returned (by e-mail) from the engineer to the server and uploads this to the PBX and then synchronises the PBX with the data store on the server.

Should the new changes cause problems then by selecting the third option, the Handset Programmer will automatically trigger the Network Portal to upload the 'Safety net' file.

In retrieving data, there is a strict sequence of GUI screens that ensure the user inputs all the information required. The sequence of events is as follows.

The latest download of the PBX is sent to the client that has initiated the remote programming feature (securely encrypted if desired). This information is stored in a file. Either an e-mail is created or the file is copied onto suitable data storage means such as a 3.5" floppy disk that can be sent by post.

When the 'amended data file' arrives (either by e-mail or on disk by post) the user must store the 'amended data file' somewhere on the client.

The process for restoring the data is:
1. Handset Programmer gets the filename of the 'amended data file'.
2. Handset Programmer sends the 'amended data file' to the Network Portal.
3. If ('Safety net' file date is not the current date) Network Portal copies the latest backup file of the PBX to a special 'Safety net' file.
4. Network Portal uploads the 'amended data file'.
5. Return to Handset Programmer.

When the network portal is first installed onto the computer server, it downloads the information on the PBX and stores the data in a file marked as "Original". This copy is never altered or removed from the server by the software. It remains there in case the software is removed and the original state restored to the PBX.

The network portal takes a daily backup of the PBX in background. This can take some time (about 10 minutes) so it is set to operate at a quiet time when the PBX usage is minimal. The technical user can change the time of this automatic dump (change auto scheduling feature). The network portal then issues an automatic download to a new file when this time is reached and deletes the oldest (seventh) copy (this does not apply to the "original" copy).

Synchronising causes the PBX to be interrogated and to retrieve and store those programs that are held within the data store on the server.

At any time the engineer can carry out an immediate download of the PBX. This means the entire set of programs is stored in a specific file on the server. This would be sensible just before the engineer is to make any manual changes. The network portal automatically keeps a predetermined number (e.g., seven) of dumps on a rolling store.

An upload selects the file to be uploaded, then uploads the file to the PBX and then synchronises the PBX with the data store.

APPENDIX 1

| Feature Name | Description |
|---|---|
| Account Code | Select and program feature under a button, then press to enter a Voluntary Account code anytime during an Exchange Line call without interrupting the conversation. |
| Alarm | Enables the turning off a telephone alarm connected to a facility alarm mechanism. |
| All Call Voice Page | Allows the user to page all of the digital and electronic telephones in the All Call Page group. |
| Automatic Busy Redial | Allows the user to set up Automatic Busy Redial after receiving busy tone on a dialled Exchange line call. Note: This feature is only available when using DASSII and other suitable digital circuits. |
| Automatic Call Back Busy | Allows the user to recall a busy extension or Do Not Disturb (DND) extension; the user may set Automatic Callback to have the system call him back when the called extension becomes available. |
| Background Music | Enables the user to turn BGM On or OFF over the user's extension speaker. |
| Call Forward All Calls | Forwards all calls to another extension, location, or voice mail device. If the extension is idle or busy and has this feature activated, all calls to it will forward immediately. The extension will not ring. |
| Call Forward Busy | Forwards calls immediately to another extension or voice mail device when the extension is busy or in the Do Not Disturb Mode. Calls will ring as normal if the telephone is idle. |
| Call Forward Busy/No Answer | Forwards calls immediately to another extension or voice mail device when the extension is busy or in the Do Not Disturb Mode. Calls will also forward if a call is not answered within a default time designated in system programming. |
| Call Forward No Answer | Forwards calls immediately to another extension or voice mail device when the telephone is not answered after a default time period designated in system programming. |
| Call Forward External | Enables the user to forward new incoming calls to a destination outside of the system. Other Call Forward modes can be set simultaneously with Call Forward-External. To forward calls to a required destination the user needs to program Speed Dial Key *49. This can be carried out using the personal speed dial feature. |
| Call Pickup Directed | Initiates a Directed Call Pickup of Exchange line, internal, and page calls. |
| Call Pickup 1, 2, 3, 4 | If the system is shared by tenants, the Directed Pickup 1-4 buttons will pick up ringing Exchange line calls for Tenants 1-4 respectively. |
| DSS | Enables the user to ring a preselected extension. The LED associated with each DSS button provides the status (idle/busy) of the extension assigned to that button. If connected to an Exchange line, pressing this button will put the outside party on hold. The user can transfer the call normal, by voice announcing or camping on by hanging up. |
| Microphone Cut-off | Enables the user to turn the microphone off/on while idle, providing privacy when the user receives handsfree internal calls. The microphone is functional when the extension receives calls - the Microphone Cut-off button controls the microphone when the user originates calls. |
| Night Transfer T1 to T4 | Select the appropriate button to control th Exchange line ringing patterns of the system for after-hours incoming calls for any of the tenants who share a single STRATA DK system. |
| Pool Lines | Permits access to an available Exchange line from a group of lines appearing under one button |
| Privacy | Blocks Privacy override on common Exchange line buttons. This button does not block Busy Override of Excutive Override. |
| Privacy Release | Releases privacy on common Exchange line buttons, enabling other extension users to enter conversations on those buttons. |
| Call Forward All Calls Fixed | Allows all internal and Exchange line calls to the extension to forward immediately to an extension pre-set in system programming, once this button is activated. |

APPENDIX 1-continued

| | |
|---|---|
| Call Group Pickup | Enables the user to pick up a call that is ringing an extension that belongs to a Pickup Group that the extension is a member of. Note: the user may belong to more than one group - see the system administrator for group assignments. |
| Do Not Disturb | Allows the user to lock the extension in or out of the Do Not Disturb (DND) mode. When button is activated, internal calls will not ring the extension and calls can not be transferred to it. Incoming Exchange line calls will mute ring at the extension. The user can continue to make calls as normal while in DND mode |
| Door Lock Button 0 to 4 | When activated will unlock a door for 3–6 seconds, depending on system programming. The Unlock Door LED will turn on for however long the door is unlocked. |
| LCD Message Select Button | Allows system and personal messages to be displayed on the optional 32-character Liquid Crystal Display (LCD) |
| Messages Waiting and Recall | Allows the Message Waiting LED to flash to indicate that a message is waiting. Pressing this button will initiate a call back to the extension or voice-mail device that activated the LED. |
| Pause | Sets pause in speed dial telephone numbers. |
| Pause Long | Sets a 10 second pause in speed dial telephone numbers. |
| Redial Last Number | Enables the user to have the system redial the last telephone number dialled from the extension, or begin to store a speed dial number. |
| Release | Allows the user to disconnect a call and to place the extension in the idle condition. |
| Save Last Number | When activated, allows the user to SAVE the number dialled (whether an outside or internal number), so that later the system can automatically redial the number when the button is pressed after accessing an outside line or the internal intercom. |
| Speed Dial Select | Enables the user to call a telephone number with a brief access code or an optional feature button. There are two types of Speed Dial numbers Personal Speed Dials or System Speed Dials. The user can create and print Personal Speed Dials but only print System Speed Dials. System Administrator however, can create and print System Speed Dials. |
| Extension (Personal) Speed Dial Select | Enables the user to program individual Personal Speed Dial access codes under a button. Note: Speed Dial Key *49 is used to forward calls to a required destination. |
| Extension (System) Speed Dial Select | Enables the user to program individual System Speed Dial access codes under a button. |
| Tone | Enables the user to change exchange line dial signals to Tone (DTMF) whilst on the line. The user must set his telephone for tone dialling AFTER the telephone number has been dialled. The telephone must have a Tone Dial Select button assigned in system programming to access this feature. |
| Start | When selected will indicate when system dialling is complete and send the digits to line. |
| Sub Address | Allows digital extension (DKT/EKT) users to separate the Dialled number and Sub-Address by pressing this feature key. |
| Exchange Lines 1–136 | Indicates individual Exchange Line access of appearing calls. When pressed this will access an outside line. Note: this does not apply to Pooled Exchange line keys. |
| Pooled Lines | Enables Multiple Exchange Lines to appear under one key. Press to activate an available Exchange line from a group of lines appearing under one button. |
| Lock | When activated enables the Lock/Unlock procedure to be executed. |
| Intercom Access Key | When pressed gives an internal dial tone. |

APPENDIX 3

Glossary of terms used

| | |
|---|---|
| AD switch | A physical switch that connects a computer server to the telephone exchange system and is automatically disconnected if an engineer plugs his laptop computer into the switch. |
| client/server | A distributed, flexible group of machines where one computer is designated the server and the others are clients. |
| COM port | Communication port |
| CTI | Computer Telephony Integration. The process by which a PBX passes certain information to a computer, allowing the computer to manage the call based on commands from a software application. |
| download | Copies data from the PBX |
| FIFO | First in first out |
| HP | See handset programmer |
| handset programmer | Software application running on client |
| digital telephone | A telephone that uses 0 and 1 to send information |
| greyed out | GUI interfaces have a notion of being hidden or visible. If they are visible, i.e. can be chosen, then the text is written in black. If they are 'hidden', i.e. temporarily been removed from choice, then they are written in grey. |
| GUI interface | GUI stands for graphical user interface. An operating system or environment that displays program choices and options on the screen as icons, or picture symbols. |
| Laptop computer | Portable PC |
| Network Portal | Software running on server |
| NP | See Network Portal |
| PBX | Private branch exchange, i.e. internal telephone exchange system. |

APPENDIX 3-continued

Glossary of terms used

| | |
|---|---|
| PC | Personal computer |
| port | A point of access into the PBX |
| power cycle | The power cycle requires an engineer to shut down the PBX and wait for 10 seconds before powering it back up. |
| server | See client/server |
| TAPI | Telephony Application Programming Interface. This is used to create a link between a Windows based application and a telephone system. |
| TCP/IP | Transmission Control Protocol/Internet Protocol. A set of layered protocols that enables shared applications among PCs, hosts or workstations in a high-speed communications environment to communicate. |
| TDNP | Telecom Data Network Portal. |
| terminal | The user interface to a communications system, typically a keyboard and CRT. |
| TSAPI | Telephony Services Application Programming Interface. A telephony programming interface from Novell and AT & T. Designed to interface a telephone PBX with a NetWare server to provide interoperability between PCs and telephone equipment. |
| upload | Copies data to the PBX |
| USB port | Universal Serial Bus port |

The invention claimed is:

1. A telecommunications system comprising a computer network comprising a server computer (1) having a number of client computers (2, 3, 4), a private branch exchange (5) connected directly to the server computer (1), a number of telecommunications devices (6, 7, 8) connected to the private branch exchange, and a communications module for communicating between the computer network (1, 2, 3, 4) and the private branch exchange (5), each telecommunications device being associated with a respective client computer, wherein the communications module is arranged and adapted so as:
   a. to store data representing the current state of programming of the private branch exchange (5), the data including private branch exchange state data representing the state of the private branch exchange, the state data including device data specific to each telecommunications device (6, 7, 8);
   b. to receive commands from the computer network (1, 2, 3, 4) relevant to the programming of the private branch exchange, said arrangement and adaptation of said communications module being such that commands relating to device data specific to each telecommunications device (6, 7, 8) are distinguished from commands relating to state data other than such device data, with commands relating to the state data other than the device data being receivable only from the server computer (1) and commands relating to the device data being additionally receivable from the respective client computer associated with a particular telecommunications device;
   c. to translate the commands (13) received from the computer network into commands suitable for programming the private branch exchange (5); and
   d. to send the commands (14) suitable for programming the private branch exchange to the private branch exchange (5) so as to effect programming of the private branch exchange;
whereby the data stored by the communications module is consistent with the data representing the current state of programming of the private branch exchange.

2. A telecommunications system as claimed in claim 1, wherein data representing the current state of programming of the private branch exchange is stored on a server computer (1).

3. A telecommunications system as claimed in claim 1, wherein means are provided which are adapted to allow a user to initiate the storage of a set of all or part of the data representing the current state of programming of the private branch exchange.

4. A telecommunications system as claimed in claim 1, wherein the data representing the current state of programming of the private branch exchange includes data relating to the particular type of computer network in use.

5. A telecommunications system as claimed in claim 4, wherein the data relating to the particular type of computer network includes data representing those commands (13) adapted to be received from the particular type of computer network in use, the communications module being adapted to use the data in translating a command from the computer network into a corresponding (14) suitable for programming the private branch exchange.

6. A telecommunications system as claimed in claim 1, wherein the data representing the current state of programming of the private branch exchange includes data relating to the particular type of private branch exchange (5) in use.

7. A telecommunications system as claimed in claim 6, wherein the data representing the current state of programming of the private branch exchange includes data representing those commands (14) suitable for programming the private branch exchange which are suitable for the particular type of private branch exchange (5) in use, the communications module being adapted to use the data in translating a command (13) received from the computer network into a corresponding command (14) suitable for programming the private branch exchange.

8. A telecommunications system as claimed in claim 1, wherein the data representing the current state of programming of the private branch exchange includes data relating to features, user access levels, telephone settings, system speed dial tables, personal speed dial tables and group pickup tables.

9. A telecommunications system as claimed in claim 1, wherein means are provided for downloading from the computer network (1, 2, 3, 4) a file corresponding to data the representing the current state of programming of the private branch exchange, for transferring the downloaded file to a control device (11), editing of the file being effected using the control device (11), transferring the edited file back to the private branch exchange (5), and uploading the edited file onto the private branch exchange (5) thereby effecting reprogramming of the private branch exchange (5).

10. A telecommunications system as claimed in claim 1, wherein means are provided for downloading from the private branch exchange (5) a file corresponding to the data representing the current state of programming of the private branch exchange, transferring the downloaded file to a control device (11), editing of the file being effected using the control device (11), transferring the edited file back to the private branch exchange (5), and uploading the edited file onto the private branch exchange (5) thereby effecting reprogramming of the private branch exchange (5).

11. A telecommunications system as claimed in claim 1, wherein a copy of the data representing the current state of programming of the private branch exchange is stored on the computer network.

12. A telecommunications system as claimed in claim 1, wherein a copy of the data representing the current state of programming of the private branch exchange is stored on a separate data storage means (17).

13. A telecommunications system as claimed in claim 1, wherein the system is adapted to store an updated copy of the data representing the current state of programming of the private branch exchange each time the programming of the private branch exchange is changed.

14. A telecommunications system as claimed in claim 1, wherein the system is adapted to store periodically a copy of the data representing the current state of programming of the private branch exchange, each copy representing a periodic backup of the state of the private branch exchange (5).

15. A telecommunications system as claimed in claim 1, wherein means are provided for reading a selected stored set of data representing the current state of programming of the private branch exchange.

16. A telecommunications system as claimed in claim 1, wherein means are provided for displaying all or part of the data representing the current state of programming of the private branch exchange.

17. A telecommunications system as claimed in claim 1, wherein each telecommunications device (6, 7, 8) has associated with it a number of user input keys, whereby various functions of the device are adapted to be selected by way of a particular key or combinations of keys.

18. A telecommunications system as claimed in claim 17, wherein the function of at least some of the user input keys or key combinations are adapted to be programmed, programming of the functions being effected by the private branch exchange.

19. A computer-readable medium encoded with a computer program comprising program code (12) for performing all the following steps when said program is run on a telecommunications system comprising a computer network comprising a server computer (1) having a number of client computers (2, 3, 4), a private branch exchange (5) connected directly to the server computer (1), and a number of telecommunications devices (6, 7, 8) connected to the private branch exchange, each telecommunications device being associated with a respective client computer:

a. storing data representing the current state of programming of the private branch exchange (5), the data including private branch exchange state data representing the state of the private branch exchange, the state data including device data specific to each telecommunications device (6, 7, 8);

b. receiving commands from the computer network (1, 2, 3, 4) relevant to the programming of the private branch exchange, with commands relating to device data specific to each telecommunications device (6, 7, 8) being distinguished from commands relating to state data other than said device data, and with commands relating to the state data other than the device data being receivable only from the server computer (1) and commands relating to the device data being additionally receivable from the respective client computer associated with a particular telecommunications device;

c. translating the commands (13) received from the computer network into commands suitable for programming the private branch exchange (5); and d. sending the commands (14) suitable for programming the private branch exchange to the private branch exchange (5) so as to effect programming of the private branch exchange;

whereby the data stored by the computer program is consistent with the data representing the current state of programming of the private branch exchange.

20. A computer-readable medium as claimed in claim 19, wherein program code is included which is adapted to detect any attempt to perform an operation which is incompatible with the current state of the telecommunications device (6, 7, 8).

21. A computer-readable medium as claimed in claim 19, wherein program code is included which is adapted to detect whether or not a user has a sufficiently high access level to perform particular tasks.

* * * * *